United States Patent [19]

Sekhar et al.

[11] Patent Number: 5,655,212
[45] Date of Patent: Aug. 5, 1997

[54] POROUS MEMBRANES

[75] Inventors: Jainagesh A. Sekhar; Vikas Gupta; Srinivas Penumella, all of Cincinnati, Ohio

[73] Assignee: Micropyretics Heaters International, Inc., Cincinnati, Ohio

[21] Appl. No.: 395,576

[22] Filed: Feb. 28, 1995

Related U.S. Application Data

[60] Continuation-in-part of Ser. No. 297,023, Aug. 29, 1994, which is a division of Ser. No. 30,586, Mar. 12, 1993, abandoned.

[51] Int. Cl.$^6$ ............................................. B01D 29/62
[52] U.S. Cl. .................... 428/552; 55/267; 55/282; 60/274
[58] Field of Search ........................ 428/552; 55/267, 55/282; 60/274

[56] References Cited

U.S. PATENT DOCUMENTS

| | | | |
|---|---|---|---|
| 4,319,896 | 3/1982 | Sweeney | 55/213 |
| 4,400,352 | 8/1983 | Rehnberg et al. | 422/4 |
| 4,791,785 | 12/1988 | Hudson et al. | 60/303 |
| 4,868,841 | 9/1989 | Affleck et al. | 372/59 |
| 4,872,889 | 10/1989 | Lepperhoff et al. | 55/267 |
| 4,948,403 | 8/1990 | Lepperhoff et al. | 55/282 |
| 5,001,899 | 3/1991 | Santiago et al. | 60/274 |
| 5,015,381 | 5/1991 | Elion et al. | 210/490 |
| 5,053,062 | 10/1991 | Barris et al. | 55/282 |
| 5,094,075 | 3/1992 | Berendes | 60/303 |
| 5,100,632 | 3/1992 | Dettling et al. | 423/213.5 |
| 5,101,095 | 3/1992 | Wagner et al. | 219/205 |
| 5,144,798 | 9/1992 | Kojima et al. | 60/303 |
| 5,154,970 | 10/1992 | Kaplan et al. | 428/304.4 |
| 5,157,007 | 10/1992 | Domesle et al. | 502/66 |
| 5,171,337 | 12/1992 | Pollock | 55/284 |
| 5,198,188 | 3/1993 | Holt et al. | 419/45 |
| 5,203,166 | 4/1993 | Miller | 60/274 |
| 5,207,807 | 5/1993 | Manfre et al. | 55/269 |
| 5,228,891 | 7/1993 | Adiletta | 55/484 |
| 5,238,472 | 8/1993 | Pfister et al. | 55/269 |
| 5,258,164 | 11/1993 | Bloom et al. | 422/174 |
| 5,259,190 | 11/1993 | Bagley et al. | 60/300 |
| 5,279,737 | 1/1994 | Sekhar et al. | 210/490 |
| 5,320,999 | 6/1994 | Muramatsu et al. | 502/303 |
| 5,334,570 | 8/1994 | Beauseigneur et al. | 502/304 |
| 5,340,548 | 8/1994 | Abe et al. | 422/177 |
| 5,342,591 | 8/1994 | Pfefferia | 423/210 |
| 5,357,755 | 10/1994 | Gillingham et al. | 60/288 |
| 5,376,610 | 12/1994 | Takahata et al. | 502/66 |
| 5,393,586 | 2/1995 | Lipp | 428/116 |
| 5,405,422 | 4/1995 | Ueda et al. | 55/267 |
| 5,409,669 | 4/1995 | Smith et al. | 422/174 |
| 5,423,180 | 6/1995 | Nobue et al. | 60/274 |
| 5,423,904 | 6/1995 | Dasgupta | 96/146 |
| 5,426,936 | 6/1995 | Levendis et al. | 60/278 |
| 5,440,880 | 8/1995 | Ceynow et al. | 60/605.2 |
| 5,449,541 | 9/1995 | Lipp et al. | 428/116 |
| 5,457,945 | 10/1995 | Adiletta | 55/301 |
| 5,458,664 | 10/1995 | Ishii et al. | 55/282 |
| 5,458,673 | 10/1995 | Kojima et al. | 95/11 |

OTHER PUBLICATIONS

Babu, V. Suresh, L. Farinash and M.S. Seebra, *Carbon in diesel particulate matter: Structure, microwave absorption, and oxidation*, J. Mater. Res., vol. 10, No. 5, May 1995, pp. 1075–1078.

Mechanical Engineering, *Reducing tailpipe emissions with catalytic converters*, Ashley, vol. 116/No. 11, Nov. 1994, pp. 81–82.

Developments in Diesel Particulate Control Systems, *Open-Pore Ceramic Foam as Diesel particulate Filter*, Mizrah, Maurer, Gauckler and Gabathuler, (Switzerland) pp. 19–27.

(List continued on next page.)

*Primary Examiner*—Donald P. Walsh
*Assistant Examiner*—Scott T. Bluni
*Attorney, Agent, or Firm*—Dinsmore & Shohl

[57] ABSTRACT

A modular membrane filter for gases liquid and particulate matter is disclosed, the filter comprising at least two porous ceramic or ceramic modules. A regenerative filter is also disclosed comprising a means for filtering; and a means for regenerating said means for filtering, said means for regenerating being integral with said filtering means.

31 Claims, 9 Drawing Sheets

OTHER PUBLICATIONS

Applied Catalysis B: Environmental, 3, *Preparation, activity and durability of promoted platinum catalysts for automotive exhaust control*, Gonzalez–Velasco, Entrena, Gonzalez–Marcos, J.I. Gutierrez–Ortiz, and M.A. Gutierrez–Ortiz, 1994 Elsevier Science B.V., pp. 191–204.

Catalysis Today, 10, *Purification of Diesel Exhaust Gas*, Saito and Ichihara, 1991 Elsevier Science Publishers B.V., pp. 45–56.

*Evaluation of a Stacked Element Diesel particulate Trap Using a newly Developed Membrane Covered Ceramic Foam Filtering Media*, Helferich and Schenck, The Duriron Company, Inc.

The Economist Newspaper Ltd., *Gassing truckers*, Business, finance and science, Science and Technology, p. 97 (UK Edition).

*Regeneration performance of a Catalyzed Versus a Non–Catalyzed Ceramic Membrane Diesel particulate Trap*, Helferich (Corcona, Inc.), Yoshida and Ogasawara (Rikon Corp.) pp. 121–134.

Fuel, 1989, vol. 68, Jul., *Exhaust emission reduction from a heavy duty diesel truck, using a catalyst and a particulate trap*, Westerholm, Hang, Egeback and Gragg, pp. 856–860.

*Start Catalyst Systems Employing Heated Catalyst Technology for Control of Emissions from Methanol–Fueled Vehicles*, Hellman, Piotrowski, and Schaefer, U.S. Environmental Protection Agency, pp. 105–122.

*Diesel Particulate Control Around the World*, Walsh and Bradow, pp. 1–17.

Exhaust Gas Purifiers, Engelhard Exceptional Technologies, *Environmental Protection from the Pioneers in Applied Catalytic Technology*, 1991 various pages.

PTX Exhaust Gas Purifiers, Engelhard Exceptional Technologies, 1991 various pages.

Oberland Particle Filter, *Mode of Operation and Structure*, pp. 1–3.

Zeuna Starker, Regeneration Systems: Filter Regeneration, various pages.

POROUS MEMBRANES

This application is a continuation in part application of application Ser. No. 08/297,023 filed Aug. 29, 1994, which is a divisional of application Ser. No. 08/030,586 filed on Mar. 12, 1993, now abandoned.

FIELD OF THE INVENTION

The present invention relates to micropyretically manufactured ceramic or ceramic composite porous membranes in a modulated design for filtration of gaseous, liquid and particulate matter, particularly in exhaust emissions aftertreatment systems. This invention also relates to a filter regeneration device comprising the ceramic or ceramic composite porous membranes and method using an integral heating element made in situ with the filtering device using porous membranes.

BACKGROUND OF THE INVENTION

Porous membranes are used in a wide variety of engineering applications. Such membranes are often used in gas or vapor separation, reverse osmosis, electrochemical applications, hyperfiltration, ultra filtration and microfiltration. Such membranes can even be used for the manipulation of chemical reactions including selective ion separation.

During the last few years, several studies have evaluated the health risks associated with exposure to engine exhaust emissions. As a result of these studies, increasing government and health organizations have decided to tighten the standards which apply to engine-run vehicles, their fuels and their particulate and gaseous emissions.

On Nov. 15, 1990, the President of the United States signed into law the Clean Air Act Amendments of 1990. Beginning in 1994, the new law sets a performance criteria, particularly requiring buses operating more than 70 percent of the time in large urban areas (using any fuel) to cut particulates by 50 percent compared to conventional heavy duty vehicles. Also, beginning in 1994, the Environmental Protection Agency began requiring a yearly testing to determine whether buses subject to the standard are meeting the standard in use over their full useful life. Similar provisions exist in other countries and a global effort is underway to find exhaust falters and cleaning devices.

Because of the financial and logistical concerns with alternative fuels, transit authorities and bus engine manufacturers are seriously considering aftertreatment systems such as trap-oxidizer technology to meet 1993/94 EPA laws and regulations. Bus engines, for example, run on a stop-and-go cycle which forces the engines to operate with a dirty and sooty exhaust. Second, these vehicles operate in dense population areas and hence, bus exhaust and pollution is considered a greater health hazard than over-the-road trucks. Third, environmentalists would like to be as clean as possible even if it means going beyond EPA regulations. All of these factors make trap oxidizer technology very attractive, provided that its long-term durability can be proven and made available at reasonable costs.

The 1993/94 EPA law and regulations are only the first step in a series of ever-tightening regulations to follow. For the diesel engines industry, the next step in regulation occurs in 1998, when the laws require tighter $NO_x$ control. Even though $NO_x$ reduction for 1994 levels will be achieved by improved engine design, it is generally accepted that to meet the 1998 levels of 4 g/Bhp-h $NO_x$, diesel engines will have to use aftertreatment systems. As the $NO_x$ level is reduced, however, the particulate level increases. Hence, in trying to meet the 1998 low $NO_x$ levels, engine manufacturers are faced with increased particulates, which require further use of aftertreatment devices such as converters and traps.

Aftertreatment devices of the present invention made of the micropyretically processed ceramic or ceramic composite porous membranes, as well as the micropyretically processed heating elements (which are essentially the ceramic or ceramic composite porous membranes), provide improved converters and trap systems which offer the flexibility, efficiency, and cost-effectiveness needed to meet the challenges presented by near-term (1994) and medium-term (1998) diesel emissions regulations. "Micropyretics" or "micropyretically synthesized," as used herein refers to self propagating high temperature synthesis as discussed in the review article by Subrahmanyam et at., in The Journal of Macromolecular Science at Vol. 27, p.p. 6249–6273 (1992).

The ceramic or ceramic composite porous membrane filters used in aftertreatment trap systems are the core of the system and great efforts are being made to fine-tune the existing systems to improve their effectiveness and durability. One of the problems of the current technology is the need for optimization of the filter structure, as in a modulated design. Another problem of the current technology is that currently available filter materials are not optimally thermally shock resistant nor are they highly thermally cyclable, as in reticulated micropyretically manufactured materials.

Presently, most of the available aftertreatment trap systems are based on the cellular cordierite ceramic monolith trap. These traps have not been efficient at collecting soot, and a large fraction of the particulate soluble organic fraction (SOF), and have several other limitations and leave much room for improvement.

For example, the straight channeled ("honey-comb") structure of the filters does not optimize stream line distortion nor surface area for particulate collection. Further, the dense wall cordierite ceramic used in today's filters is expensive.

The above described need for improved aftertreatment systems led to the invention of an alternative trap technology which was provided by the ceramic fiber coil traps developed by Mann and Hummel and Daimler Benz in West Germany. These traps were composed of a number of individual filtering elements, each of which consisted of a number of thicknesses of silica fiber yarn wound on a punched metal support. A number of those filtering elements were suspended inside a large metal can to make up a trap. However, failures during German field demonstrations appear to have reduced or eliminated work on that system, according to "Diesel Particulate Control Around the World," Michael P. Walsh et at. part of "Global Developments in Diesel Particulate Control" P-240, publ. SAE, Inc. (February 1991).

Numerous other trapping media have also been tested or proposed, including ceramic foams, corrugated mullite fiber felts, and catalytic coated stainless steel wire mesh.

In addition to the problems of the presently available aftertreatment systems addressed above, the high concentration of soot per unit of volume in the ceramic monolith of the cellular trap makes these traps sensitive to "regeneration" conditions. Trap loading, temperature, and gas flow rates must be maintained within a fairly narrow window. Otherwise, the trap fails to "regenerate" fully, or cracks or melts to overheating because the high temperature gradients in the filter monolith damage the cordierite structure.

The most challenging problem of trap oxidizer system development has been with the process of "regenerating" the filter by burning off the accumulated particulate matter. Initiating and controlling the regeneration process to ensure reliable regeneration without damage to the trap is the central engineering problem of trap oxidizer development today. The reason is that over time, the filter becomes loaded with the soot it has trapped and must be cleaned or "regenerated". The process of regeneration burns or "oxidizes" the soot collected within the filter. The cleaned filter can be used many times provided it can be successfully regenerated many thousands of times over its lifetime without failure. Many different regeneration concepts are being tested. They range from primitive off-board regeneration of the filter in an external oven to sophisticated on-board automatic electrical or burner regeneration systems using electronic controls and include catalytic injection system. These approaches to regeneration can generally be divided into two groups: passive systems and active systems. Passive systems must attain the conditions required for regeneration during normal operation of the vehicle. Active systems, on the other hand, monitor the build up of particulate matter in the trap and trigger specific actions leading to regeneration when needed.

Passive regeneration systems face special problems on heavy duty vehicles. Exhaust temperatures from heavy duty diesel engines are normally low, and recent developments such as charge air cooling and increased turbo charger efficiency are reducing them still further. Under some conditions, it would be possible for a truck driver to drive for many hours without exceeding the exhaust temperature (around 400°–450° C.) required to trigger regeneration.

Active systems, on the other hand, are generally expensive, often requiring complex logic and electronics to initiate regeneration.

Engine and catalysts manufacturers have experimented with many catalytic converters and with a wide variety of regenerative catalytic traps. Precious metal catalytic traps are effective in oxidizing gaseous hydrocarbons and CO as well as the particulate SOF but are relatively ineffective in preventing soot oxidation, a particular problem for diesel engines. Moreover, these metals also promote the oxidation of $SO_2$ to particulate sulfates such as sulfuric acid ($H_2O_4$). Base metal catalytic traps, in contrast, are effective in promoting soot oxidation, but have little effect on hydrocarbons, CO, NO or $SO_2$. Another disadvantage of precious metal catalysts is that they are very expensive.

Unlike a catalytic trap, however, a flowthrough catalytic converter does not collect most of the solid particulate matter, which simply passes through in the exhaust. The particulate control efficiency of the catalytic converter is, of course, much less than that of a trap. One of the major disadvantages of the catalytic converter is the same as with the precious metal catalytic particulate trap: sulfate emissions. The main object of the catalysts used is to raise the exhaust temperature to a point that could convert the gaseous compounds to safer gaseous emissions. The catalysts undergo chemical reactions which raise the temperature of the exhaust gases allowing them to be converted to the safer gases. One of the major reasons which catalytic material and treatments are used to assist in trap regeneration, is that none of the heating systems attempted, such as diesel fuel burners, electrical heaters and other heaters have been successful. However, if there were a regeneration system in which a converter or trap could be used without a catalyst for regeneration, the above-listed objects would be achieved.

With respect to processes for the manufacture of porous ceramic articles, U.S. Pat. No. 3,090,094, issued May 21, 1963 to K. Schwartzwalder et al, discloses a method of making an open-cell porous ceramic article which comprises immersing an open-cell spongy material, preferably polyurethane, in a slurry containing a ceramic coating material to coat cell-defining walls of the spongy material, removing excess slurry from the spongy material, and firing the coated spongy material at a temperature and for a time sufficient to remove the spongy material and form a hardened, vitrified structure. The ceramic coating material may include particulate zirconia, zircon, petalite, mullite, talc, silica and alumina, having particle sizes ranging from −80 mesh to −600 mesh. A binder such as clay, sodium silicate, and calcium aluminate and phosphoric acid, is preferably present in the slurry. Firing is conducted at 500° to 3000° F. (260° to 1650° C.), preferably at 2100° to 2950° F. (1150° to 1620° C.).

U.S. Pat. No. 3,097,930, issued Jul. 16, 1963 to I. J. Holland, discloses a method of making a porous shape of sintered refractory material which comprises impregnating a foamed plastic sponge shape with a suspension of refractory particles, drying the impregnated shape, and firing the dried shape in an inert atmosphere to volatilize the sponge material and to sinter the refractory particles. The impregnation and drying steps may be repeated. The foamed plastic sponge may be polystyrene, polyethylene, polyvinyl chloride, latex, or polyurethane, the latter being preferred. Refractory materials include clays, minerals, oxides, borides, carbides, silicides, nitrides and mixtures thereof. Specific examples used alumina, beryllia and china clay with particle sizes ranging from less than 1 to greater than 10 microns. Firing was conducted at 1700° C. for alumina and 1350° C. for china clay.

U.S. Pat. No. 4,697,632, issued Oct. 6, 1987 to N. G. Lirones, discloses a ceramic foam filter, insulating refractory lining, and a melting crucible, and a process for production thereof, which comprises providing an open-cell foam pattern, impregnating the pattern with a ceramic slurry, burning out the foam pattern at a temperature between 1400° and 2200° F. (760° and 1205° C.) to form a ceramic substrate, impregnating the ceramic substrate with additional ceramic slurry, and firing the impregnated ceramic substrate at a temperature of 2200° to 3400° F. (1205° to 1870° C.). The foam pattern material may be a flexible polyurethane, polyethylene, polypropylene or graphite. A suitable ceramic slurry contains from 1% to 20% silica (dry weight), and from 99% to 80% alumina (dry weight), with a viscosity between 5 and 20 seconds and a film weight between 1.0 and 8.0 grams per standard six inch square plate. Preferably the slurry includes a suspending agent, a wetting agent and a defoaming agent. Zirconia may also be used as ceramic material.

U.S. Pat. No. 3,111,396, issued Nov. 19, 1963 to B. B. Ball, discloses a method of making a porous metallic article which comprises impregnating a porous organic structure with a suspension of powdered metal, metal alloy or metal compound, and binder, slowly drying the impregnated structure, heating at about 300°–500° F. (150°–260° C.) to char the organic structure, and then heating at about 1900° to about 3000° F. (1040° to 1650° C.) to sinter the powder into a porous material.

Other United States patents relating to porous ceramic filters and methods for making them include: U.S. Pat. No. 3,893,917—Jul. 8, 1975—M. J. Pryor et al; U.S. Pat. No. 3,947,363—Mar. 30, 1976—M. I. Pryor et al; U.S. Pat No. 3,962,081—Jun. 8, 1976—J. C. Yarwood et al; U.S. Pat. No. 4,024,056—May 17, 1977—J. C. Yarwood et al; U.S. Pat. No. 4,081,371—Mar. 28, 1978—J. C. Yarwood et al; U.S. Pat. No. 4,257,810—Mar. 24, 1981—T. Narumiya; U.S. Pat.

No. 4,258,099—Mar. 24, 1981—T. Narumiya; and U.S. Pat. No. 4,391,918—Jul. 5, 1983—J. W. Brockmeyer.

None of the above patents disclose or suggest the desirability of using conductive ceramic or ceramic composite porous membrane filters, which can also be used as heating elements. Additionally, there is no suggestion in any of the above patents to impregnate a substrate with a ceramic or ceramic composite slurry in the manner undertaken by the present invention. The problems associated with the prior art methods are similar to the problems associated with the method described in U.S. Pat. No. 5,279,737, which problems are described in greater detail below.

U.S. Pat. No. 5,279,737 ("the '737 patent") discloses a process for producing a porous ceramic, ceramic composite or metal-ceramic structure by micropyretic synthesis wherein a form polymer shape is impregnated with a slurry of ceramic precursors and ignited to initiate micropyretic synthesis, thereby attaining a ceramic, ceramic composite or metal-ceramic composite article having interconnected porosity. The '737 patent is incorporated by reference into the present application, in its entirety.

In the past, it was extremely difficult to incorporate a heating device into a filter because thermal cycling problems from incompatible thermal expansions of the heating element and filter. This made it difficult to have a filter with an integral heating element. The material used for the heating elements are typically molybdenum disilicide based. This material is able to heat to 550° C. in only a few seconds, which combats the well-known problem of cold-start emissions in motor vehicles. Other superior properties include high emissivity of approximately 0.9, as compared to other heating elements which have emissivities of 0.4 to 0.75. The fact that the heating element is integral with the filter provides the advantage of less complexity, less moving parts and less cost. Most other systems depend upon many complex systems including logic and electronics to heat the filter or the exhaust gases, which is very costly and problematic. All materials made by the micropyretic technique experience a large temperature gradient of more than 1000 centimeters per millimeter during manufacture. This includes both filters and heating elements made by micropyretic technique. Due to the extreme conditions that the materials must endure during synthesis, the materials made by the micropyretic technique result in porous ceramics which are extremely thermally shock resistant, highly thermally cyclable and forgiving when contacted with the heating element. Because they possess these qualities, they are extremely well-suited for exhaust aftertreatment systems.

To date, such rapid heating elements were not available. Non micropyretic heating elements even though made principally of molybdenum disilicide or silicon carbide are extremely expensive. Furthermore, they cannot heat as rapidly because they are not manufactured by the micropyretic technique. Another reason why heating elements have not been used in situ with the types of filters most commonly used today, is that the extruded cellular configuration of the presently available falters is ill suited for integral heating elements. The extruded channels made of the ceramic act as an insulator with respect to the other channels. Therefore, one would need many heating elements, one per cellular channel to have an in situ heating configuration, a highly impractical and extremely expensive consideration.

The in situ heating elements would also enhance the catalytic converters already in use, today. Catalytic converters are heated during operation, and the EPA specifies a minimum time in which the catalysis bed must reach operating temperature. The standard solution has been to add an "pup" converter—a second, small converter upstream of the main unit. It acts like an igniter, and heats the exhaust stream rapidly, but little else about them is satisfactory. Even a small converter adds significant costs. It is often difficult to fit even a sizable converter into limited space, and it creates shielding problems by placing another source of intense heat close to engine components. All of these problems are overcome by the integral in situ heating element of the present invention.

Several different methods have been attempted to heat catalytic converters, including miniature radio transmitters that activate a non contact heating device heater, and additional catalysis. The present invention deals with the necessity of heating catalysts without the expense and complexity of the prior art.

There is also a greater need for technological improvements in catalytic converters and other engine emission reduction devices because there is a finite limit to the amount of platinum the most commonly used catalyst. Moreover, platinum is extremely expensive.

The idea of having an in situ heating element within a filter has many applications outside of exhaust systems, as well. One of these applications would be in a simple heating device. One of the major advantages is that the heating element is actually inserted into the filter rather than being supplied from outside the filter.

U.S. Pat. No. 5,094,075, issued Mar. 10, 1992 to Heinrich Berendes, discloses a particulate filter that can be regenerated by means of a burner working in the main engine exhaust stream. Regeneration is achieved by means of a burner to which fuel and oxygen-containing gas is supplied in a variable proportion. By this means, the burner produces the output required to achieve the regeneration temperature in the diesel engine. This patent requires an outside burner, instead of an in situ integral heating element, in order to regenerate the filter.

U.S. Pat. No. 5,015,381, issued May 14, 1991 to M. Edmund Eliion, et at, discloses a fluid filter element, filter, and process for its fabrication, wherein the filter element includes a flat base and a thin layer deposited thereupon having a channels though which a fluid may flow. In operation, the element is pressed against a flat surface, preferably against the backside of another element and a stack of filter elements, wherein the channels become closed conduits. The channels have a minimum requirement of thickness of the layer so that larger particles may not pass therethrough. Fabrication of the thin layer with the channels therein is preferably accomplished by masking a pattern corresponding to the channels and then vapor depositing the remainder of the thin layer, as masking and deposition permits actuated control of the heights of the deposited layer and then the minimum dimension of the channels. This patent does not disclose the modular design nor does it account for regeneration of soot and particulates.

U.S. Pat. No. 5,001,899, issued Mar. 26, 1991 to Enrique Santiago, et al, discloses a method and apparatus for cleaning of a soot filter in the exhaust line of a diesel engine with a combustion chamber placed in front of the soot filter where fuel nozzle and adapted electrical ignition method is built and thereby enabling the afterburning of the exhaust without secondary air. The exhaust in the combustion-chamber is mixed with the fuel which is injected through the fuel nozzle, and ignited by an ignition device with the existing portion of the unburned oxygen. The half exhaust effects the burndown of the accumulated soot in the soot filter. The apparatus disclosed herein is complex and requires many parts and does not teach a simple integral heating element to burn the soot in the filter.

"Regeneration Performance Of A Catalyst Versus Non-Catalyst Ceramic Membrane Diesel Particulate Trap", Rich Helfrich, et al, Global Developments and Diesel Particulate Control P-240 Society of Automotive Engineers, Inc., 121–132 (February 1991), describes a ceramic foam trap system using a parallel flow stacked element design. The individual elements are bonded together to form subassembly of 12 to 14 elements. The ceramic foam filter elements are non-reticulated material with a microporous membrane on a down stream (outer) side of the filter element. The trap itself has a center inlet through which the exhaust flows in the individual elements by way of the annular inlet ports (formed by adjacent elements). The elements in this invention are all the same size and each have the same function. The filtration of the gas in such a system is in a 'parallel' fashion and such a filter system is clearly non-modulated as described and claimed herein.

U.S. Pat. No. 4,400,352, issued Aug. 23, 1983 to Ovea Rehnburg, et at, discloses a method and device for optimizing purification of diesel exhaust gases, the purification being carried out by a catalysis. This invention does not disclose modulated design nor does it disclose incorporating a heating element into the filter for regeneration.

"Gassing Truckers", The Economists Newspaper Limited, Business Finance and Science: Science and Technology: Pg. 97 describes a particle trap which works like filters in the exhaust pipe using two traps and switching between them, so one trap filters while the other one burns the collected particles. That article admits, that despite years of research, those traps were still unreliable, strongly indicating the need for reliable particle traps. Although the design described has two separate filter units, it does not teach the modular design of the present invention.

U.S. Pat. No. 5,334,570 discloses a porous catalyst support which may be used in a catalytic converter for treating automotive exhaust gases. The desirability of increasing "open frontal area" available for filtration is recognized. However, no mention or suggestion is made of increasing roughness to achieve this objective.

For the foregoing reasons, there is a need for an aftertreatment system of high effectiveness, low complexity and low cost, as well as a regenerating system incorporating a heating element (which is essentially a ceramic or ceramic composite porous membrane), integral with an exhaust ceramic or ceramic composite porous membrane filter, wherein both are highly thermally cyclable.

SUMMARY OF THE INVENTION

The present invention is directed to porous membranes with a greater range of properties and applications. The present invention also relates to multilayer as well as single layer monolithic membranes, and also layers of composite membranes. The present invention relates to using these micropyretically manufactured ceramic or ceramic composite porous membranes in a modulated design for filtration of gaseous, liquid and particulate matter, particularly in exhaust emissions aftertreatment systems. This invention also relates to a filter regeneration device comprising the ceramic or ceramic composite porous membranes and method using an integral heating element made in situ with the filtering device using porous membranes. This invention also relates to using this process for producing a device including the ceramic or ceramic composite porous membranes, which device acts as a heating element and as a filter in a regenerative filter application, particularly in exhaust emissions after treatment systems.

The primary goal of the present invention is to provide improved catalytic converters and filters using the ceramic or ceramic composite porous membranes of the present invention, which meet the United States 1994 and 1998 federal, state and local diesel emission regulations.

Yet another goal of the present invention is to initiate and control the regeneration process of a filter using ceramic or ceramic composite porous membranes of the present invention, to ensure reliable regeneration without damage to the trap oxidizer.

Yet another object of the present invention is to make the filter oxidizers less sensitive to regeneration conditions.

A further object of the present invention is to reduce the overall costs of filters used in exhaust systems.

A further object of the present invention is to provide a regeneration system in which a converter or a trap oxidizer could be used without the need for using a catalyst for regeneration.

Yet another object of the present invention is to provide a heating element integral with a filter, wherein both are highly thermally cyclable and wherein both are ceramic or ceramic composite porous membranes.

A further object of the present invention is to provide a heating element which is formed in situ with the filter, both heating element and filter being a ceramic or ceramic composite porous membrane.

Yet another object of the present invention is to provide ceramic or ceramic composite porous membrane heating elements which heat up extremely rapidly.

In accordance with the first aspect of the present invention, these is provided, a modulated ceramic or ceramic composite porous membrane filter for gaseous, liquid and particulate matter wherein the modules in said filter are porous ceramic or ceramic composite membranes, said membranes having interconnected or straight through porosity and having been manufactured using micropyretic synthesis, the filter comprising at least two porous ceramic or ceramic composite membrane modules. Preferably each said membrane module is optimized for extracting different materials.

In accordance with the second aspect of the present invention is provided a regenerator ceramic or ceramic composite porous membrane filter comprising a means for filtering and a means for regenerating said means for filtering, said means for regenerating being integral with said filtering means.

DETAILED DESCRIPTION OF THE INVENTION

Figure 1A:
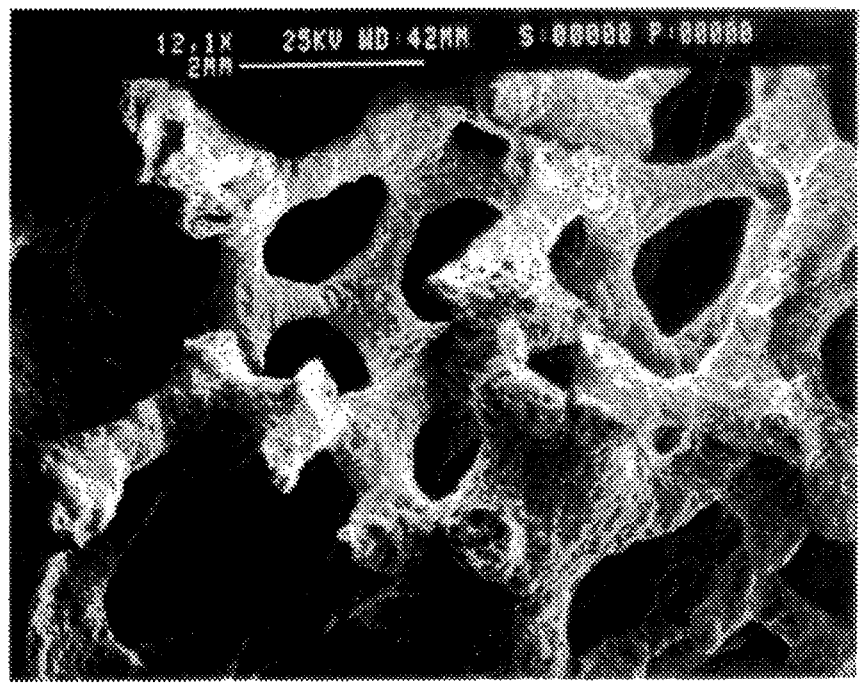
FIG. 1(a) is a micrograph of an $Al_2O_3$—SiC ceramic manufactured in accordance with U.S. Pat. No. 5,279,737.
Figure 1B:
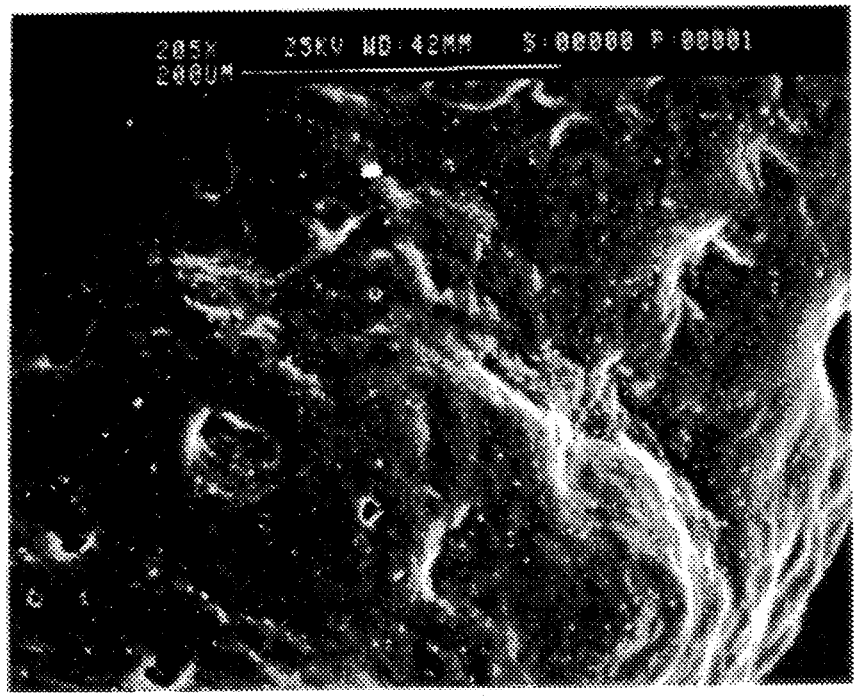
FIG. 1(b) is an enhanced micrograph of the ceramic of FIG. 1(a)

The present invention relates to a wide variety of single layer and multilayer porous membranes used in diverse engineering applications. These membranes may be thin, two dimensional bodies with a single layer membrane having a thickness within the range of 50 microns to 10 mm or can also be much thicker being generally cylindrical in shape. It is believed that the pores in present membranes can range in size from 0.1 micron to 500 microns. Because the pores have different shapes, pore size is usually determined by converting the pore area into an equivalent circular area. Pore densities can be within the range of 20 to 80%.

The basic method for making or synthesizing a porous membrane includes preparing a slurry having at least one micropyretic substance and at least one liquid carrier for the micropyretic substance. The slurry is preferably applied to the surface of a substrate or article and allowed to dry on the surface into a green form of the membrane. The green form of the membrane is then fired or burned according to micropyretic principles in order to form a porous membrane. It is often desirable to modify the slurry with the addition of other substances, referred herein as diluents. The slurry could have a consistency ranging from very fluid to very powdery. Such slurries according to the present invention can include various combinations of the following constituents:

1) Micropyretic substances or agents. These agents are typically particles, fibers, or foils of materials such as Ni, Al, Ti, B, Si, Nb, C, $Cr_2O_3$, Zr, Ta, Mg, Zn, MgO, $ZnO_2$, $ZrO_2$, $TiO_2$, $B_2O_3$, Fe or combinations thereof which may react to yield both heat as well as clean and nascent products from the combustion. Typical reactions could be for example $Cr_2O_3+Al+B$, Ni+Al or Ti+B or $C+Al+SiO_2$, etc., which react spontaneously to give $CrB_2$, $Ni_3Al$ or $TiB_2$ or SiC and $Al_2O_3$, respectively, with a large release of heat. The adiabatic temperature of such a micropyretic reaction could be as high as 6,500° K. Tables I, II, and III give a partial listing of micropyretic reactions (reactants and products) and the approximate amount of heat released in each reaction. $\Delta H$(KJ/mole) is the enthalpy release for the reaction and $T_{ad}$ K is the adiabatic temperature which is expected to be reached in such reactions. The enthalpy release and the adiabatic temperature are not precisely known for all the reactions in Tables I–III. However, all of the reactions listed are believed to be sufficiently exothermic. Table IV gives a list of some micropyretic reactions and stoichiometries. It is believed that mixtures of the constituents of Table I–IV are also possible along with the addition of diluents which could often be the product itself or other materials in powder, foil, fiber or other form of a predetermined size. It is also believed that each of the reactants and products of the reactions listed in Tables I–III could function as diluents.

TABLE 1

FORMATION OF REFRACTORY COMPOUNDS

| REACTION | $\Delta H$(KJ/mole) | $T_{ad}$K |
|---|---|---|
| $Ti + 2B = TiB_2$ | −293 | 3190 |
| $Zr + 2B = ZrB_2$ | −263.75 | 3310 |
| $Nb + 2B = NbB_2$ | −207.74 | 2400 |
| $Ti + B = TiB$ | −158.84 | 3350 |
| $Hf + 2B = HfB_2$ | −310.15 | 3520 |
| $Ta + 2B = TaB_2$ | −193.53 | 3370 |
| $Ti + C = TiC$ | −232 | 3210 |
| $3B_2O_3 + 10Al + 3TiO_2 = 3TiB_2 + 5Al_2O_3$ | | 4000 |
| $B_2O_3 + 5Mg + TiO_2 = TiB_2 + 5MgO$ | | |
| $B_2O_3 + 5Zn + TiO_2 = TiB_2 + 5ZnO$ | | |
| $2B_2O_3 + 5Zr + 2TiO_2 = 2TiB_2 + 5ZrO_2$ | | |
| $Si + C = SiC$ | −65.3 | 1800 |
| $W + C = WC$ | −40.6 | 1000 |
| $V + C = VC$ | −102 | 2400 |
| $Nb + C = NbC$ | −140 | 2800 |
| $2Nb + C = Nb_2C$ | −186 | 2600 |
| $Zr + C = ZrC$ | −202.9 | 3440 |
| $Hf + C = HfC$ | −218.6 | 3900 |
| $Ta + C = TaC$ | −142.9 | 2700 |
| $2Ta + C = Ta_2C$ | −202.7 | 2660 |
| $4Al + 3C = Al_4C_3$ | −208.8 | 1670 |
| $2Mo + C = Mo_2C$ | −50 | 1000 |
| $4B + C = B_4C$ | −71 | 1000 |
| $V + 2B = VB_2$ | | 2670 |
| $La + 6B = LaB_6$ | | 2800 |
| $W + B = WB$ | | 1700 |
| $2W + B = W_2B$ | −87 | 1400 |
| $Cr + 2B = CrB_2$ | −94.1 | 2470 |
| $U + 4B = UB4$ | | 1770 |
| $Mo + 2B = MoB_2$ | | 1800 |
| $Mo + B = MoB$ | −112.4 | 1800 |
| $Al + 12B = AlB_{12}$ | −200.6 | |
| $Ti + 1/2N_2 = TiN$ | −336.6 | 4900 |
| $3Ti + NaN_3 = 3TiN + Na$ | | |
| $3Si + 2N_2 = Si_3N_4$ | −738.1 | 4300 |
| $3Si + 4NaN_3 = Si_3N_4 + 4Na$ | | |
| $Hf + 1/2N_2 = HfN$ | −368.7 | 5100 |
| $B + 1/2N_2 = BN$ | −254.1 | 3700 |
| $Zr + 1/2N_2 = ZrN$ | | 4900 |
| $Ta + 1/2N_2 = TaN$ | −252.1 | 3360 |
| $2Ta + 1/2N_2 = Ta_2N$ | −272.5 | 3000 |
| $V + 1/2N_2 = VN$ | −216.9 | 3500 |
| $Al + 1/2N_2 = AlN$ | −302.5 | 2900 |
| $La + 1/2N_2 = LaN$ | −299.4 | 2500 |
| $3Be + N_2 = Be_3N_2$ | −564.0 | 3200 |
| $U + 1/2N_2 = UN$ | −286.8 | 3000 |
| $3Mg + N_2 = Mg_3N_2$ | −416.1 | 2900 |
| $Nb + 1/2N_2 = NbN$ | −237.8 | 3500 |
| $2Nb + 1/2N_2 = Nb_2N$ | −248.3 | 2670 |

TABLE II

FORMATION OF INTERMETALLICS

| REACTION | $\Delta H$(KJ/mole) | $T_{ad}$K |
|---|---|---|
| $Ti + Ni = TiNi$ | −278.2 | 1773 |
| $Ti + Pd = TiPd$ | −103.4 | 1873 |
| $Ni + Al = NiAl$ | −118.4 | 1911 |
| $Ti + Al = TiAl$ | −72.8 | 1654 |
| $Ti + Fe = TiFe$ | −40.6 | 1110 |
| $5Ti + 3Si = Ti_5Si_3$ | −578.9 | 2500 |

TABLE II-continued

FORMATION OF INTERMETALLICS

| REACTION | ΔH(KJ/mole) | $T_{ad}K$ |
|---|---|---|
| Ti + 2Si = TiSi$_2$ | −134.2 | 1800 |
| Ti + Si = TiSi | −130 | 2000 |
| Mo + 2Si = MoSi$_2$ | −131.7 | 3190 |
| W + 2Si = WSi$_2$ | −92.9 | 1500 |
| 5V + 3Si = V$_5$Si$_3$ | −461.9 | 3190 |
| Ta + 2Si = TaSi$_2$ | −119.1 | 1800 |
| Zr + Si = ZrSi | −155 | 2100 |
| Zr + 2Si = ZrSi$_2$ | −153.8 | 2100 |
| 5Zr + 3Si = Zr$_5$Si$_3$ | −147.6 | 2800 |
| Nb + 2Si = NbSi$_2$ | −137.9 | 1900 |
| 2Ni + SiC = Ni$_2$Si + C | −76 | |
| 3Ni + 2SiC = Ni$_3$Si$_2$ + 2C | −98 | |
| Cd + S = CdS | −149.2 | 2000 |
| Mn + S = MnS | −213.2 | 3000 |
| Mo + 2S = MoS$_2$ | −275 | 2300 |
| Ni + 2S = NiS$_2$ | | |
| Ni + P = NiP | | |
| Nb + P = NbP | | |
| 3Ni + Al = Ni$_3$Al | −153.2 | |
| 3Ni$_3$Al$_2$ + 9Ni = 6Ni$_3$Al | | |
| Ni + 3Al = NiAl$_3$ | −162 | |
| 3Ni + 2Al = Ni$_3$Al$_2$ | −282.6 | |
| Ti + 3Al = TiAl$_3$ | −142.1 | 1517 |
| Cu + Al = CuAl | | 899 |
| Cu + 2Al = CuAl$_2$ | | |
| 4Cu + 3Al = Cu$_4$Al$_3$ | | |
| 3Cu + 2Al = Cu$_3$Al$_2$ | | |
| 9Cu + 4Al = Cu$_9$Al$_4$ | | |
| Fe + Al = FeAl | −18 | |
| 3Fe + Al = Fe$_3$Al | −31.8 | |
| Zr + Al = ZrAl$_2$ | | 1918 |
| Pd + Al = PdAl | | 2579 |
| Ti + Ni = TiNi | −66.5 | 1552 |
| Ti + Pt = TiPt | −159.5 | |
| Ti + Co = TiCo | −47.7 | 1723 |
| Co + Al = CoAl | −110.4 | 1901 |
| 50Ti + (50 − x)Ni + xPd = Ti$_{50}$Ni$_{50-x}$Pd | | |
| 50Ti + (50 − x)Ni + xFe = Ti$_{50}$Ni$_{50-x}$Fe | | |
| 50Cu + (50 − x)Al + xNi = Cu$_{50}$Al$_{50-x}$Ni | | |
| 50Cu + (50 − x)Al + xMn = Cu$_{50}$Al$_{50-x}$Mn | | |

TABLE III

FORMATION OF COMPOSITES

| REACTION | ΔH(KJ/mole) | $T_{ad}K$ |
|---|---|---|
| Fe$_2$O$_3$ + Al = Al$_2$O$_3$ + 2Fe | −836 | 3753 |
| Cr$_2$O$_3$ + Al = Al$_2$O$_3$ + 2Cr | −530 | 2460 |
| 3Cr$_2$O$_3$ + 6Al + 4C = 2Cr$_3$C$_2$ + 3Al$_2$O$_3$ | | 6500 |
| 0.86Ti + 1.72B + 1.48Al = 0.86TiB$_2$ + 1.48Al | −293 | 1450 |
| Ti + C + 0.68Ni = TiC + 0.68Ni | −232 | 1370 |
| Zr + 2B + Cu = ZrB$_2$ + Cu | −263.75 | 1100 |
| 4Al + 3SiO$_2$ + 3C = 2Al$_2$O$_3$ + 3SiC | | |
| 3Fe$_3$O$_4$ + 8Al = 4Al$_2$O$_3$ + 9Fe | −816 | 3509 |
| 3NiO + 2Al = Al$_2$O$_3$ + 3Ni | −928 | 3546 |
| 3MnO$_2$ + 4Al = 2Al$_2$O$_3$ + 3Mn | −878 | 4123 |
| 3SiO$_2$ + 4Al = 2Al$_2$O$_3$ + 3Si | | |
| 3TiO$_2$ + 4Al = 2Al$_2$O$_3$ + 3Ti | | |
| Fe$_2$O$_3$ + 3Mg = 3MgO + 2Fe | −323 | 3076 |
| Fe$_3$O$_4$ + 3Mg = 4MgO + 3Fe | −316 | 3184 |
| Cr$_2$O$_3$ + 3Mg = 3MgO + 2Cr | −221 | 2181 |
| NiO + Mg = MgO + Ni | −353 | 2579 |
| 3MnO$_2$ + 2Mg = 2MgO + Mn | −337 | 3665 |
| 2Fe$_2$O$_3$ + 3Si = 3SiO$_2$ + 4Fe | −311 | 2626 |
| Fe$_3$O$_4$ + 2Si = 2SiO$_2$ + 3Fe | −298 | 1808 |
| 2NiO + Si = SiO$_2$ + 2Ni | −373 | 2602 |
| 2MnO$_2$ + Si = 2SiO$_2$ + Mn | −339 | 3024 |
| 2Fe$_2$O$_3$ + 3Ti = 3TiO$_2$ + 4Fe | | |
| 2Fe$_2$O$_3$ + 3Zr = 3ZrO$_2$ + 4Fe | | |
| 2Cr$_2$O$_3$ + 3ZrO$_2$ + 4Cr | | |
| Ti + 2B + aTiB$_2$ + bCu = (a + 1)TiB$_2$ + bCu | | |

TABLE III-continued

FORMATION OF COMPOSITES

| REACTION | ΔH(KJ/mole) | $T_{ad}K$ |
|---|---|---|
| CrO$_3$ + Cr$_2$O$_3$ + 6Al + 2C + 3NiO = Cr$_3$C$_2$ + 3Al$_2$O$_3$ + 3Ni | | |
| Nb$_2$O$_5$ + Al$_2$Zr + vAl$_2$O$_3$ = 2Nb + ZrO$_2$ + Al$_2$O$_3$ + vAl$_2$O$_3$ | | |
| Nb$_2$O$_5$ + 2Al + Zr + vAl$_2$O$_3$ = 2Nb + ZrO$_2$ + Al$_2$O$_3$ + vAl$_2$O$_3$ | | |
| Nb$_2$O$_5$ + 10/3Al + ΦZrO$_2$ + vAl$_2$O$_3$ = 2Nb + ΦZrO$_2$ + 5/3Al$_2$O$_3$ + vAl$_2$O$_3$ | | |
| B$_4$C + (x + 5)Ti = xTiB + 4TiB + TiC | | |
| 2Ti + C + 2B = TiB$_2$ + TiC | | |
| 38B + TiAl$_3$ = TiB$_2$ + 3AlB$_{12}$ | | |
| 3TiO$_2$ + 4Al + 3C = 3TiC + 2Al$_2$O$_3$ | | 2300 |
| 9TiO + 11C + 2TiAl$_3$ = 11TiC + 3Al$_2$O$_3$ | | |
| 3SiO$_2$ + 4Al + 3C = 3SiC + 2Al$_2$O$_3$ | | |
| 3ZrSiO$_4$ + 4Al + 3C = 3ZrO$_2$ + 3SiC + 2Al$_2$O$_3$ | | |
| WO$_3$ + 2Al + C = WC + Al$_2$O$_3$ | | |
| 2B$_2$O$_3$ + 4Al + C = B$_4$C + 2Al$_2$O$_3$ | | |
| 2ZrO$_2$ + 4Al + C = ZrC + 2Al$_2$O$_3$ | | |
| 2MoO$_3$ + Al + 3C = 3Mo$_2$C + 2Al$_2$O$_3$ | | |
| 3B$_2$O$_3$ + 10Al + 3TiO$_2$ = 3TiB$_2$ + 2Al$_2$O$_3$ | | 4000 |
| 6B + 4Al + 3TiO$_2$ = 3TiB$_2$ + 2Al$_2$O$_3$ | | 4000 |
| 10B$_2$O$_3$ + 3TiO$_2$ + 2B + 8TiAl$_3$ = 11TiB$_2$ + 12Al$_2$O$_3$ | | |
| 9TiO$_2$ + 26B + 4TiAl$_3$ = 13TiB$_2$ + 6Al$_2$O$_3$ | | |
| 3Ti + 3 B$_2$O$_3$ + 2TiAl$_3$ = 3TiB$_2$ + 3Al$_2$O$_3$ | | |
| B$_2$O$_3$ + ZrO + 10/3Al = ZrB$_2$ + 5/3Al$_2$O$_3$ | | 2400 |
| MoO$_3$ + 2Al + B = MoB + Al$_2$O$_3$ | −1117.3 | 4000 |
| 3HfO$_2$ + 4Al + 6B = 3 HfB + 2Al$_2$O$_3$ | | |
| 3V$_2$O$_5$ + 10Al + 3N$_2$ = 6VN + 5Al$_2$O$_3$ | | 4800 |
| 3TiO$_2$ + 2Al + NaN$_3$ = 3TiN + Al$_2$O$_3$ + Na | | |
| 3TiO$_2$ + 4Al + 1.5NaCN = 3TiCo$_{0.5}$N$_{0.5}$+ 2Al$_2$O$_3$ + 1.5Na | | |
| Ti + 0.5C + 0.167NaN$_3$ = TiC$_{0.5}$N$_{0.5}$ + 0.167Na | | |
| MoO$_3$ + 2Al + 2Si = MoSi$_2$ + Al$_2$O$_3$ | | 3300 |
| 2Si$_3$N$_4$ + 4B$_2$O$_3$ + 9Al$_2$O$_3$ = | | 4800 |
| 8BN + 3(3Al$_2$O$_3$ + 2SiO$_2$) | | |
| TiO$_2$ + 2Mg + C = TiC + 2MgO | | |
| SiO$_2$ + 2Mg + C = SiC + 2MgO | | 2300 |
| 2B$_2$O$_3$ + 6Mg + C = B$_4$C + 6MgO | | |
| B$_2$O$_3$ + 5Mg + TiO$_2$ = TiB$_2$ + 5MgO | | |
| MoO$_3$ + 3Mg + B = MoB + 3MgO | | |
| MoO$_3$ + Mg + 2Si = MoSi$_2$ + 3MgO | | |
| TiO$_2$ + Zr + C = TiC + 2ZrO$_2$ | | |
| SiO$_2$ + Zr + C = SiC + ZrO$_2$ | | |
| 2B$_2$O$_3$ + 5 Zr + 2TiO$_2$ = 2TiB$_2$ + 5ZrO$_2$ | | |
| 2MoO$_3$ + 3Zr + 2B = 2MoB + 3ZrO$_2$ | | |
| 2MoO$_3$ + 3Zr + 4Si = 2MoSi$_2$ + 3ZrO$_2$ | | |
| 1/2V$_2$O$_5$ + 11/3B = VB$_2$ + 5/6B$_2$O$_3$ | | 2700 |
| 1/2Cr$_2$O$_3$ + 3B = CrB$_2$ + 1/2B$_2$O$_3$ | | 1900 |
| 2MoO$_3$ + 5B = Mo$_2$B + 2B$_2$O$_3$ | | 3000 |
| 1/2Fe$_2$O$_3$ + 2B = FeB + 1/2B$_2$O$_3$ | | 2400 |
| 1/2Fe$_2$O$_3$ + 4B + 2Fe = 3FeB + 1/2B$_2$O$_3$ | | 1800 |
| 2MoO$_3$ + 10Mo + 24B = 11MoB$_2$ + B$_2$O$_3$ | | 2200 |
| PbO + MoO$_2$ = PbMoO$_3$ | | 1340 |
| PbO$_2$ + WO$_2$ = PbWO$_4$ | | 2000 |
| BaO$_2$ + SiO = BaSiO$_3$ | | 1880 |
| BaO$_2$ + TiO = BaTiO$_3$ | | 1980 |
| PbO$_2$ + TiO = PbTiO$_3$ | | 1440 |
| MnO$_2$ + TiO = MnTiO$_3$ | | 1630 |
| MnO$_2$ + TiO = MnSiO$_3$ | | 1540 |
| Si + N$_2$ + Si$_3$N$_4$ + (SiO$_2$)$_x$ + AlN = Si$_{6-z}$Al$_z$O$_z$N$_{8-z}$ | | 2673 |

TABLE IV

SAMPLE MICROPYRETIC REACTIONS AND STOICHIOMETRIC WEIGHTS

| REACTION | WEIGHT % |
|---|---|
| Ni + Al = NiAl | Ni: 68.5, Al: 31.5 |
| 3Ni + Al = Ni$_3$Al | Ni: 86.7, Al: 13.3 |
| 3Cr$_2$O$_3$ + 6Al + 4C = 2Cr$_3$C$_2$ + 3Al$_2$O$_3$ | Cr$_2$O$_3$: 69, Al: 24, C: 7 |

TABLE IV-continued

SAMPLE MICROPYRETIC REACTIONS
AND STOICHIOMETRIC WEIGHTS

| REACTION | WEIGHT % |
|---|---|
| $MoO_3 + 2Al + B = MoB + Al_2O_3$ | $MoO_3$: 69, Al: 25.9, B: 5.1 |
| $MoO_3 + 2Al + 2Si = MoSi_2 + Al_2O_3$ | $MoO_3$: 57, Al: 21, Si: 22 |
| $Ti + 2B = TiB_2$ | Ti: 68.9, B: 31.1 |
| $5Ti + 3Si + Ti_5Si_3$ | Ti: 74, Si: 26 |
| $Nb + 2Al = NbAl_2$ | Nb: 63.3, Al: 36.7 |
| $Zr + 2B = ZrB_2$ | Zr: 80.8, B: 19.2 |
| $Nb + 2B = NbB_2$ | Nb: 81.1, B: 18.9 |
| $Fe_2O_3 + 2Al = Al_2O_3 + 2Fe$ | $Fe_2O_3N$: 74.7, Al: 25.3 |
| $Cr_2O_3 + 2Al = Al_2O_3 + 2Cr$ | $Cr_2O_3$: 73.8, Al: 26.2 |
| $0.86Ti + 1.72B + 1.48Al = 0.86TiB_2 + 1.48Al$ | Ti: 41.3, B: 18.7, Al: 40 |
| $Ti + B = TiB$ | Ti: 81.6, B: 18.4 |
| $Hf + 2B = HfB_2$ | Hf: 89.2, B: 10.8 |
| $Ta + 2B = TaB_2$ | Ta: 89.3, B: 10.7 |
| $Ti + C = TiC$ | Ti: 80, C: 20 |
| $Ti + Ni = TiNi$ | Ti: 44.9, Ni: 55.1 |
| $Ti + Pd = TiPd$ | Ti: 31.0, Pd: 69.0 |
| $Ti + Al = TiAl$ | Ti: 64, Al: 36 |
| $Ti + Fe = TiFe$ | Ti: 46.2, Fe: 53.8 |
| $Ti + C + 0.68Ni = TiC + 0.68Ni$ | Ti: 48, C: 12, Ni: 40 |
| $Ni + 3Al = NiAl_3$ | Ni: 42, Al: 58 |
| $4Al + 3SiO_2 + 3C = 2Al_2O_3 + 3SiC$ | Al: 33.29, $SiO_2$: 55.59, C: 11.2 |

Also included in the referenced slurry used to make the membranes could be the following components:

2) A liquid carrier (i.e., liquid suspending medium) which could be aqueous or non-aqueous and have either a low or high viscosity. The carrier is most often chosen from a group of plasticizers (i.e., binders in suspension) which may include clays of various sorts such as bentonite, fused silica, kaolinite and related compounds; silicates; borates; stearates and other lubricants including $MoS_2$ and PbS; methyl cellulose and related compounds; organic liquids such as acetone, polyvinyl butyryl, polyvinyl alcohol, polyethylene glycol, oils of various kinds, tetraisoamyloxide, and water. The plasticizer may also be a colloidal liquid such as colloidal alumina, colloidal ceria, colloidal yttria, colloidal silica, colloidal zirconia, mono-aluminum phosphate, colloidal cerium acetate or mixtures thereof. Colloidal binders can also be derived from a suspension containing colloid precursors and reagents which are solutions of at least one salt such as chlorides, sulfates, nitrates, chlorates, perchlorates or metal organic compounds. Colloidal binders will usually be relatively dilute aqueous or non-aqueous suspensions, but the use of concentrated colloids or partly or fully precipitated colloids is also possible. Alternatively, the colloidal binder can be derived from a suspension containing chelating agents such as acetyl acetone and ethylacetoacetate. Various mixtures of different carriers are possible. When using colloids, three types of colloidal processing are possible. The first involves the gelation of certain polysaccharide solutions. The other two involve colloids and metal organic compounds. These last two involve the mixing of materials in a very fine scale. Colloids may be defined as comprising a dispersed phase with at least one dimension between 0.5 nm (nanometer) and about 10 microns (micrometers) in a dispersion medium which in the present case is a liquid. The magnitude of this dimension distinguishes colloids from bulk systems in the following way: (a) an extremely large surface area and (b) a significant percentage of molecules reside in the surface of colloidal systems. Up to 40% of molecules may reside on the surface. The colloidal systems which are important to this invention are both the thermodynamically stable lyophilic type (which include macro molecular systems such as polymers) and the kinetically stable lyophobic type (those that contain particles). In the formation of the slurry, new materials and other agents or diluents may be mixed in with the plasticizers.

3) One diluent may be a powder additive containing carbides, silicides, borides, aluminides, nitrides, oxides, carbonitrides, oxynitrides and combinations thereof. When choosing combinations of powder additives, the particle size selection is important. It is preferable to choose particle sizes below 100 microns and when employing combinations of powder additives, to choose particle sizes which are varied such that the packing of particles is optimized. Generally, the ratio of the particle sizes will be in the range from about 2:1 to about 5:1. Sometimes packing is optimized by choosing one constituent size three times smaller than the other constituent, i.e., having a particle ratio size of about 3:1.

4) Metallic particles, intermetallic particles or a combination thereof, for example Cu, Ni, Pt, Al, Cr, Zr, Zn, Mg, Fe, Mn, NiAl, $NiAl_3$, CrSi, CrB, etc. The sizes of these particles are also preferably varied to achieve optimum packing, like with the above powder additives.

5) Metal organic compounds principally metal alkoxides of the general formula $M(OR)_z$, where M is a metal or a complex cation made up of two or more elements, R is an alkyl chain and z is a number usually in the range from 1 to 12. Alternatively, these metal alkoxides can be described as solutions in which molecules of organic groups are bound to a metal atom through oxygen. Examples of metal alkoxides are silicon tetraisoamyloxide, aluminum butoxide, aluminum isopropoxide, tetraethyl orthosilicates, etc. The organic portions of other metal organic compounds may include formates, acetates and acetylacetonates.

6) Pyrolizable chlorosilanes, polycarbosilanes, polysilazanes and other organosilicon polymers may be used as binders which pyrolize to useful products for oxidation prevention. Such compounds are expected to participate in the micropyretic reaction in a beneficial but complex manner to increase the yield of useful products with a morphology and size useful for the membrane. Organosilicon polymers typically dissolve in water and therefore should be avoided when producing membranes for filtering aqueous solutions.

7) Alkaline or acitic solutions may be needed to modify the pH of the slurry. Standard laboratory grade alkalines and acids are used.

8) Burnable and/or oxidizable liquid or solid constituents such as polymers (e.g., polyurethane, polyester) or carbonaceous materials may be added to the slurry to be eventually burned off leaving behind a predetermined pore size and pore volume (density) in the membrane.

Tables V and VI give examples of typical slurry compositions.

TABLE V

EXAMPLES OF MICROPYRETIC SLURRY COMPOSITIONS

| SAMPLE | SOLID POWDER COMPOSITION (Wt %/Particle Size) | LIQUID CARRIER (Vol. %) | POWDER/ CARRIER (g/ml) |
|---|---|---|---|
| 1 | SiC (60%/3 Microns), $Si_3N_4$ (10%/1 Micron), Ti (17%/−325 Mesh)*, and $TiB_2$ (5%/−325 Mesh)* | Colloidal - Silica 50% Colloidal - Alumina 50% | 10/6 |
| 2 | SiC (72.5%/1−3 Microns), $Si_3N_4$ (2.5%/0.1−1 Micron), $Y_2O_3$ (5%/0.1−1 Micron), Ti (15%/−325 Mesh)*, and Si (5%/−325 Mesh)* | Colloidal - Silica 50% Colloidal - Alumina 50% | 10/5 |
| 3 | SiC (50%/1 Micron), Zr (4%/1 Micron), B (5%/ 1 Micron), C (7%/1 Micron), Al (3%/−325 Mesh)*, Ti (27%/−325 Mesh)*, $Al_2O_3$ (2%/0.3 Microns), $MoSi_2$ (0.5%/0.5 Microns), $Cr_2O_3$ (0.5%/0.5 Microns), and $TiB_2$ (1%/1 Micron) | **Colloidal Yttria, Polycarbosilane, Mono- aluminum phosphate, Methyl Cellulose, Polyvinyl Alcohol, Colloidal Ceria, Colloidal Zirconia | 10/6 |

*−325 mesh ≅ 44 microns
**any of these liquid carriers may be used alone or in combination.

TABLE VI

EXAMPLES OF NON-MICROPYRETIC SLURRY COMPOSITIONS

| SAMPLE | SOLID POWDER COMPOSITION (Wt %/Particle Size) | LIQUID CARRIER (Vol. %) |
|---|---|---|
| 1 | $TiB_2$ (25 gms/1 Micron) | Colloidal Alumina (10 ml) |
| 2 | $CrB_2$ (25 gms/10 Microns) | Colloidal Alumina (10 ml) |

Once the desired slurry mixture is prepared, the slurry is then dried into a green form having a desired geometric configuration. The slurry may be applied to the surface of a substrate or article. The applied slurry is then dried, such as by air drying or being baked at relatively low temperatures, for example, in an oven, usually so as not to start the micropyretic reaction. There are various methods of applying the slurry including painting (by brush or roller), dipping, spraying, or pouring the liquid onto the surface. Typically, each coating of the slurry is allowed to dry before another coating is added. However, the underlying coating does not necessarily need to be entirely dry before the next coating is applied. If one or more coatings with micropyretic constituents are present, then it is preferable to dry these coatings completely prior to firing (i.e., the combustion step). Multiple coatings may be necessary in order to obtain the desired layer thickness. Depending upon the slurry composition, additional coatings may be added to already fired layers either for repair or for additional build up. Even when micropyretic constituents are absent, it is preferred to heat the green membrane with a suitable heat source, such as a torch (e.g., butane or oxyacetylene), a laser, a furnace, etc., if improvement in the densification of the membrane is required. Such heating takes place preferably in air but could be in other oxidizing atmospheres or in inert or reducing atmospheres.

In general, the micropyretic layers provide heat for the bonding of several layers as well as bonding to the substrate or article. While membranes with multiple micropyretic layers can be produced according to the invention, multi-layer membranes with one or more non-micropyretic layers can also be produced, if desired. These non-micropyretic layers could for example be made of polymers.

If desired, bonding of the coatings to the surface of the substrate or article can be enhanced by treating the surface. The surface may be treated by sandblasting or pickling with acids or fluxes such as cryolite or other combinations of fluorides and chlorides prior to the application of the coating. Similarly, the substrate may be cleaned with an organic solvent such as acetone to remove oily products or other debris prior to the application of the coating.

In the case of micropyretic coatings, an additional step after the drying of the slurry coating(s) will be the firing or combustion of the slurry constituents (i.e., the membrane in its green state). Combustion of the green membrane can be performed by direct flame, concentrated sunlight, a plasma, a laser or an electron beam. In addition, if the substrate or article is conductive, the green form can be combusted by passing a current through the substrate or article. The coated substrate or article could also be placed inside a furnace at a predetermined temperature and time or heated by an induction method or by radiant heating. The particulate substances was particulate substances which sinter above a given temperature, in particular reactant and/or non-reactant substances that reaction sinter at a temperature greater than about 0.5 Tm, where Tm is the melting point of the lowest melting reaction product.

Additional heat can be applied to a membrane in order to reduce the pore size and pore density in the membrane. The present method is good for obtaining membranes with pore sizes ranging from 10 nanometers to 100 microns. In-situ repair, rather than replacement of membranes by using the principles of the present invention is also contemplated.

The preferred embodiments of the present invention will now be described in greater detail.

First Embodiment

This aspect of the present invention provides a modulated ceramic or ceramic composite membrane filter for gaseous, liquid and particulate matter, wherein the modules in said filter are porous ceramic or ceramic composite membranes, said membranes having interconnected porosity and having been manufactured using micropyretic synthesis, the filter comprising: at least two porous ceramic or ceramic composite membrane modules.

Optionally, the ceramic or ceramic composite membrane modulated filter of the present invention also comprises a catalyst, the catalyst being applied to the filter by coating, impregnating and combinations thereof; and wherein the catalyst reacts or is reactive under conditions of vacuum, room temperature, increased temperature, pressure or combinations thereof.

Optionally, each ceramic or ceramic composite membrane module of the filter is optimized for extracting a different material, particularly, particulates, carbon particles, $NO_x$, CO, $CO_2$, $SO_2$, hydrocarbons, and combinations thereof.

Preferably, the porous ceramic or ceramic membrane composite is reticulated. "Reticulated" as used herein refers to a porous 3-dimensional structure without straight-through channels.

As stated above, the greater the roughness of a filter material, the better the performance of the filter. Therefore, it is preferred that the porous ceramic or ceramic membrane composite has a rough surface. A "rough" surface as used herein may be understood as a surface with a high frequency of peaks and valleys, the peaks and valleys creating spaces suited for particle trapping. See FIGS. 1(a) and (b), which illustrate a typical "rough" ceramic membrane composite used as modules in the present embodiment. The roughness of the ceramic or ceramic membrane composite can be enhanced either chemically or mechanically.

Of the several materials disclosed in the '737 patent, it is preferred that the ceramic or ceramic membrane (even in its heating element form), composite comprise a material selected from the group consisting of borides or aluminides of titanium, zirconium, niobium, tantalum, molybdenum, hafnium, chromium, and vanadium; aluminides (except of aluminum), carbides and oxides of titanium, hafnium, boron, aluminum, tantalum, silicon, tungsten, zirconium, niobium, and chromium; carbonitrides of titanium, niobium, iron, molybdenum, vanadium, and tantalum; nitrides of titanium, zirconium, boron, aluminum, silicon, tantalum, hafnium, and niobium; silicides of molybdenum, titanium, zirconium, niobium, tantalum, tungsten and vanadium; hydrides of titanium, zirconium and niobium; aluminum oxide-titanium boride; titanium carbide-titanium boride; aluminum oxide-titanium boride-titanium nitride; aluminum oxide-titanium boride-titanium carbide; boron carbide-aluminum oxide; molybdenum silicide-aluminum oxide; molybdenum boride-aluminum oxide; chromium carbide-aluminum oxide; vanadium nitride-aluminum oxide, aluminides of nickel, compounds of platinum, ruthenium, rhodium, gold, silver, iron, titanium and palladium in the form of coatings, phosphides of nickel, titanium-nickel, oxides and oxychlorides of ruthenium, mullite, cordierite, lanthanum chromite, graphite and compounds and mixtures thereof.

Comparative Example

Figure 2:
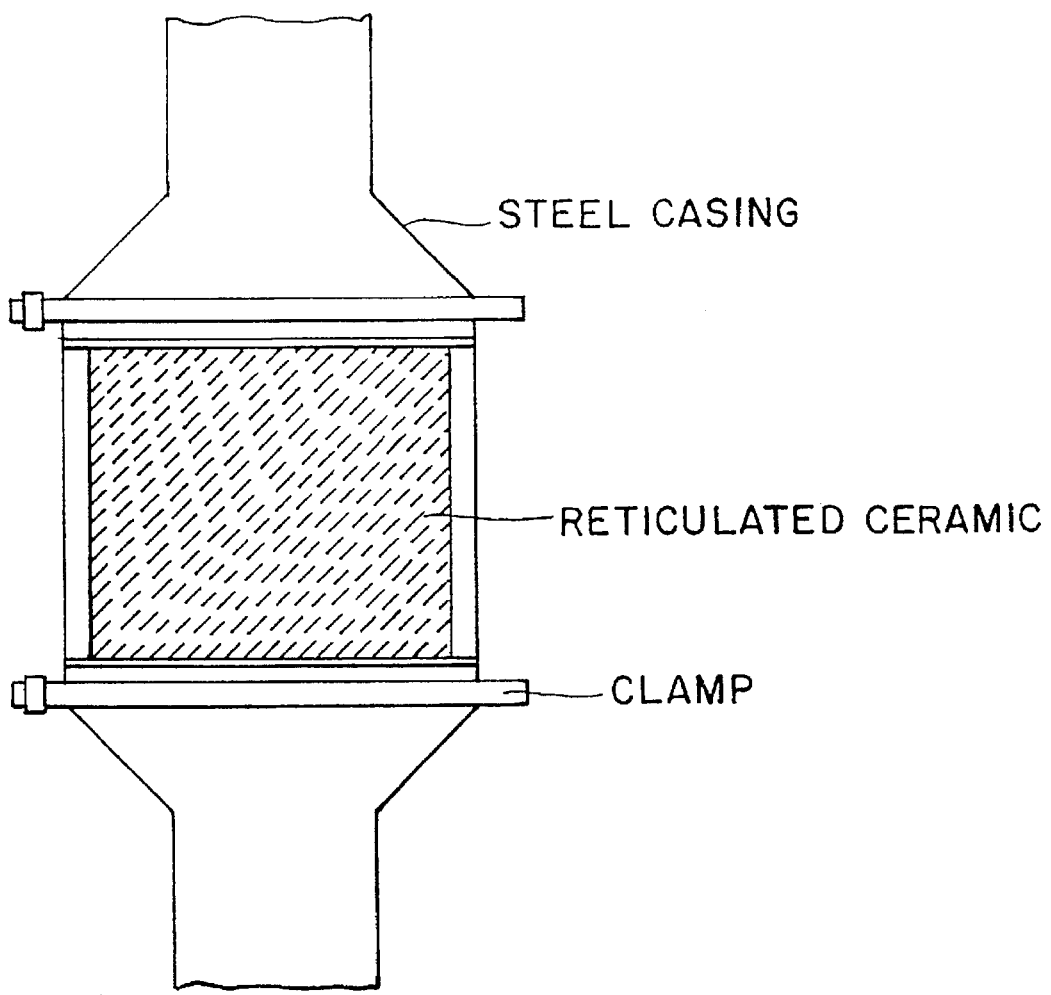
FIG. 2 is a schematic of membrane Filter I as described herein.
Figure 3:
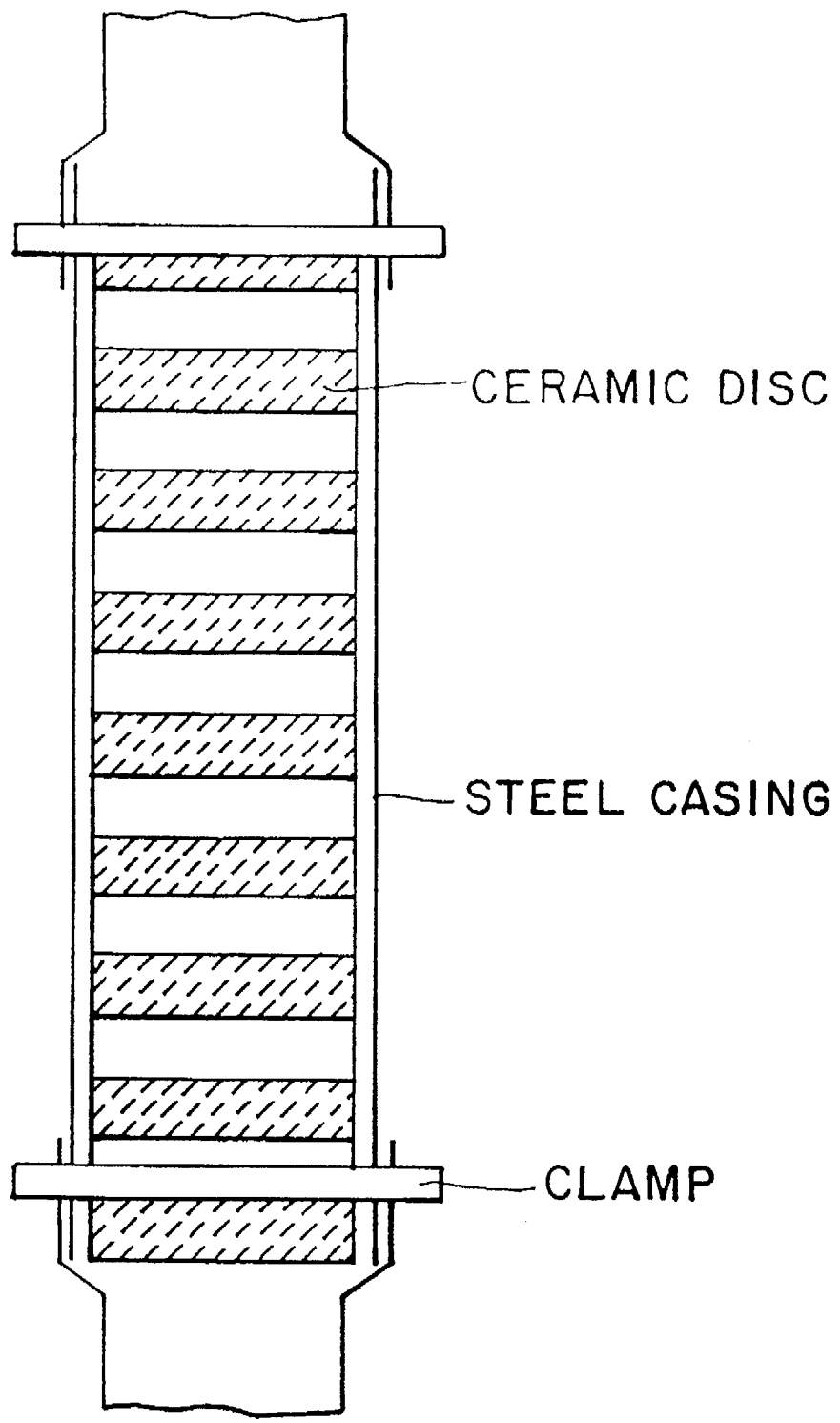
FIG. 3 is a schematic of modulated Membrane Filter II as described herein.

Two alumina-silicon carbide ($Al_2O_3$—SiC) membrane filters were made of porous reticulated ceramic fabricated by the process of U.S. Pat. No. 5,279,747. The first membrane filter (I) was made by using a ten pores per inch, cylindrical shaped reticulated membrane ceramic having a 4" diameter and 3" height. The ceramic membrane monolith was packed in a steel casing as shown in FIG. 2. See also, FIG. 10. The second membrane filter (II) was made by stacking nine, ten pores per inch reticulated membrane ceramic discs of 2" diameter and ½" thickness, alternating them with a steel ring ½" long to separate the membrane ceramic discs in a 9"long steel casing, making a modular membrane filter (FIG. 3).

Figure 4:
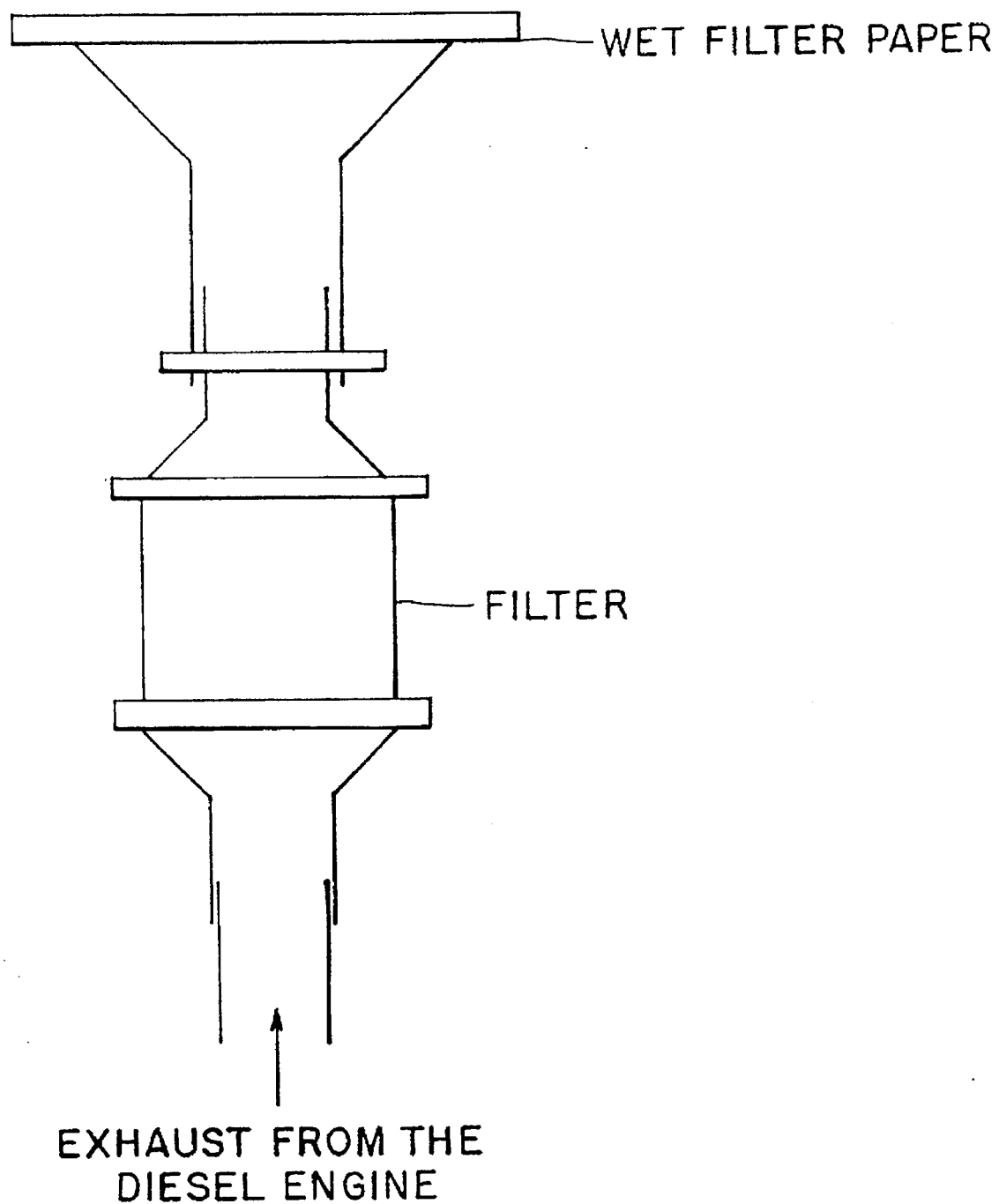
FIG. 4 is a schematic of the test setup used herein for testing membrane filters.

The two membrane filters for particulate matter were tested on a diesel engine to compare their performance with the diesel filters available in the market. Engelhard's 3DVC-PTX and 4DVC-PTX diesel filters were used to do the comparison. These filters have a ceramic monolith with square shaped cells, passing straight through the whole body, with a mean wall thickness of 0.15 mm and 14 pores per inch. This ceramic monolith is manufactured by Corning Inc. The setup for the test comprised of a 22 HP four stroke diesel engine made by Lister Petter and a paper holder with a filter paper to catch the particles from the engine exhaust. See FIG. 4. The setup was in the open at an ambient temperature of 40° F. All the four filters I, II, 3DVC and 4DVC were successively tested. Each of these filters were connected to the engine exhaust pipe as shown in the set up. The filter paper was uniformly sprayed with water to enable the exhaust particles to stick to the surface. The engine was started and was run for two minutes for each filter.

Figure 5:
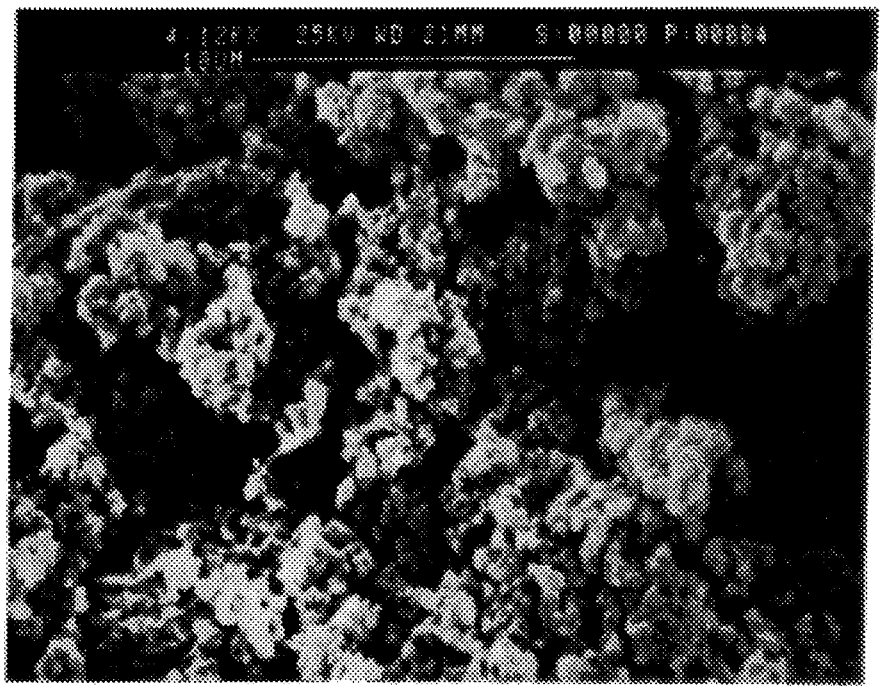
FIG. 5 is a micrograph of the filter paper used to collect the exiting material after filtration by a prior art filter.
Figure 6:
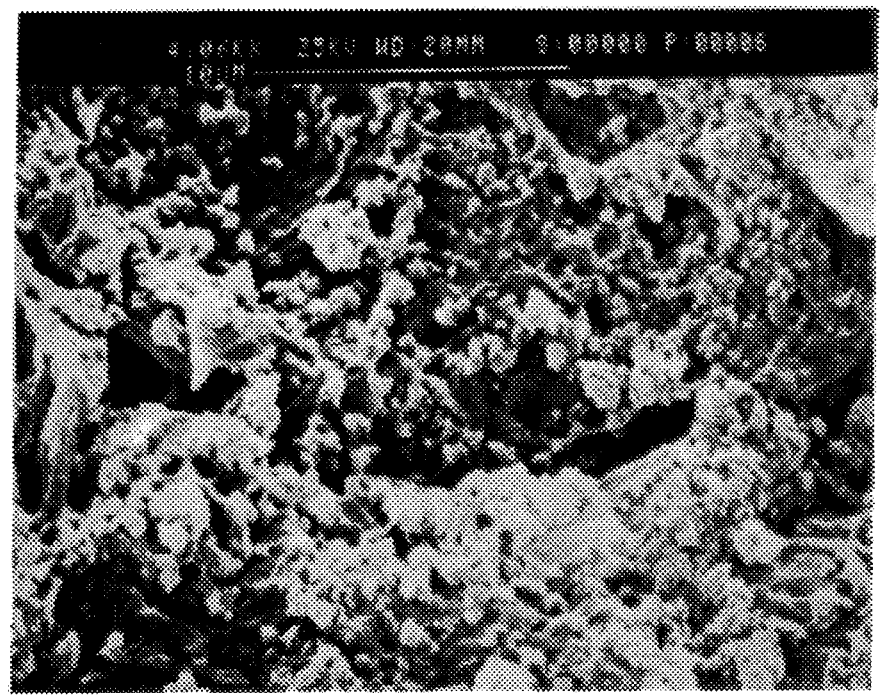
FIG. 6 is a micrograph of the filter paper used to collect the exiting material after filtration by a single membrane module of the present invention.
Figure 7:
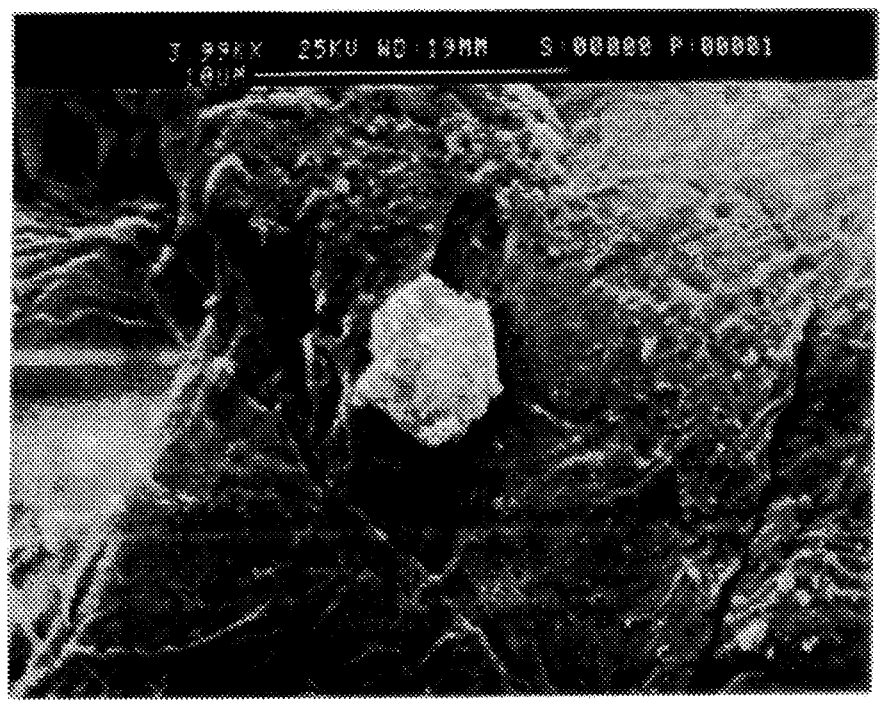
FIG. 7 is a micrograph of the filter paper used to collect the exiting material by a modulated membrane filter in accordance with the present invention.

The gain in weight of the paper, which was used for collecting the particles from the exhaust, and visual inspection, were used as the criterion for determining the performance of the filters. Membrane filter I and Filter 4DVC had exactly the same dimensions. The gain in weight of the filter paper due to the particles collected from the exhaust of Membrane filter I was 0.01 g, where as that from filter 4DVC was 0.03 g. Also the paper used the filter 4DVC was much darker with more black spots than the one used with Membrane filter I. See FIG. 5 which is a micrograph of the filter paper used with 4DVC; FIG. 6 which is a micropyretic of the filter paper used with Membrane filter I; and FIG. 7 which is a micrograph of the filter paper used with Membrane filter II. Thus, it is clearly demonstrated that Membrane filter I is much superior in performance as compared to filter 4DVC.

Membrane filter II was the best filter among the four filters tested. See FIGS. 5, 6 and 7. The gain in weight was negligible and the paper was slightly yellowed with no black spots, suggesting a high degree of filtration.

Second Embodiment

In its broadest form, the second aspect of the present invention provides a regenerative membrane filter comprising: a means for filtering; and a means for regenerating said means for filtering, said means for regenerating being integral with said filtering means.

Preferably, the means for filtering comprises at least one porous ceramic or ceramic composite membrane having interconnected porosity and having been manufactured using micropyretic synthesis. Preferably, the means for regenerating is a heating element. Optionally, the regenerating means may also be a catalyst. Even more preferably, the heating element/catalyst can be a porous ceramic or ceramic composite membrane.

The membrane/heating element comprises a compound selected from the group consisting of metallic material, molybdenum silicides, Fe—Cr—Al, Ni—Cr, SiC and combinations thereof.

The membrane/heating element preferably comprises a material selected from the group consisting of borides or aluminides of titanium, zirconium, niobium, tantalum, molybdenum, hafnium, chromium, and vanadium; aluminides (except of aluminum), carbides and oxides of titanium, hafnium, boron, aluminum, tantalum, silicon, tungsten, zirconium, niobium, and chromium; carbonitrides of titanium, niobium, iron, molybdenum, vanadium, and tantalum; nitrides of titanium, zirconium, boron, aluminum, silicon, tantalum, hafnium, and niobium; silicides of molybdenum, titanium, zirconium, niobium, tantalum, tungsten and vanadium; hydrides of titanium, zirconium and niobium; aluminum oxide-titanium boride; titanium carbide-titanium boride; aluminum oxide-titanium boride-titanium nitride; aluminum oxide-titanium boride-titanium carbide; boron carbide-aluminum oxide; molybdenum silicide-aluminum oxide; molybdenum boride-aluminum oxide; chromium carbide-aluminum oxide; vanadium nitride-aluminum oxide, aluminides of nickel, compounds of platinum, ruthenium, rhodium, gold, silver, iron, titanium and palladium in the form of coatings, phosphides of nickel, titanium-nickel, oxides and oxychlorides of ruthenium, mullite, cordierite, lanthanum chromite, graphite and compounds and mixtures thereof.

Preferably, the membrane regenerating means (the heating element or catalyst) is formed in situ with the membrane ceramic or ceramic composite filter.

Preferably, the membrane ceramic or ceramic composite is reticulated. The catalyst, if present, is applied to the filter by coating, impregnating, and combinations thereof.

EXAMPLE 1

Figure 12:
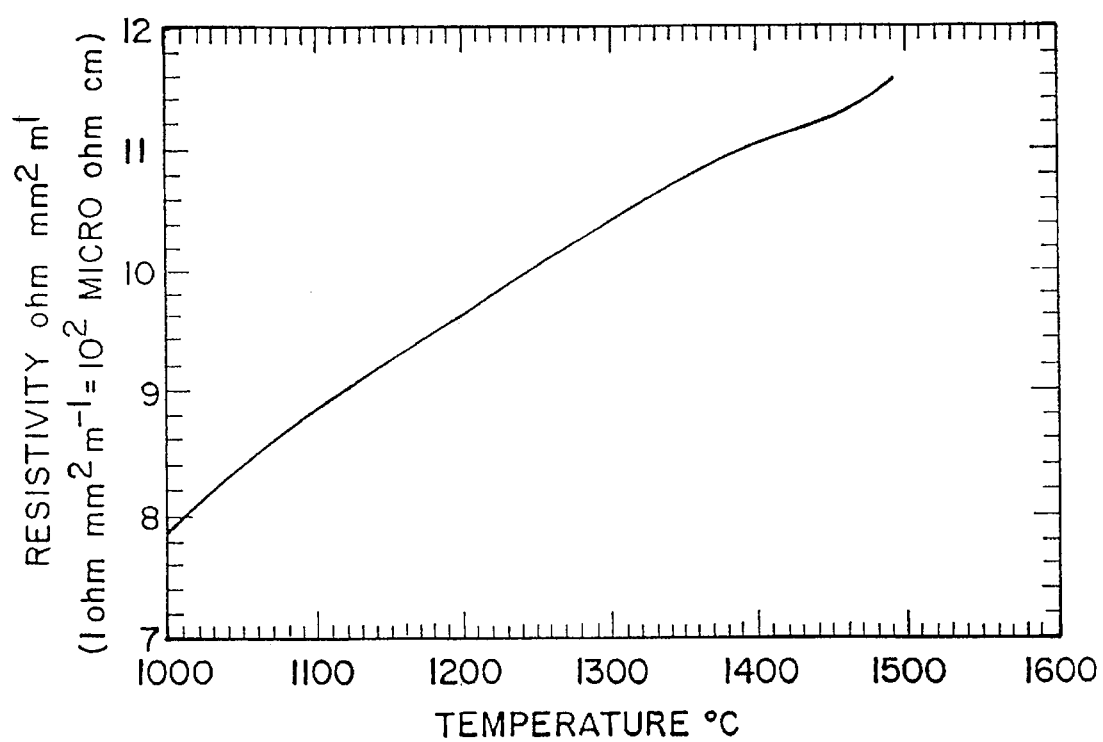
FIG. 12 is a graph of temperature versus resistivity of HR-1550, the heating element material used in Example 1.

A reticulated membrane filter with a pore size of 10 pores per inch (,pore sizes ranging from 10–80 pores per inch are most preferred for the practice of the invention), manufactured according to U.S. Pat. No. 5,279,737 was made, except that a 3 mm high resistivity heating element manufactured by Micropyretics Heaters International under the trade name HR-1550 with terminals was incorporated into the reticulated membrane filter prior to combusting the sample. See, FIG. 12 which is a resistivity to temperature graph for HR-1550, showing that the resistivity of HR-1550 increases with temperature. "High" resistivity means 50–5000 μohm-cm, whereas "low" resistivity is understood to be around 1 μohm-cm. "Low" resistivity heating elements require in excess of 300 amps to be heated up quickly, but a typical 12 V automobile battery can only generate less than 100 amps. Therefore, it is important that a high resistivity heating element be used. Materials which may be used as high resistivity heating elements are: molybdenum disilicide, silicon carbide, tungsten silicide, zirconium oxide, lanthanum chromite, graphite, compounds and composites thereof.

Figure 8:
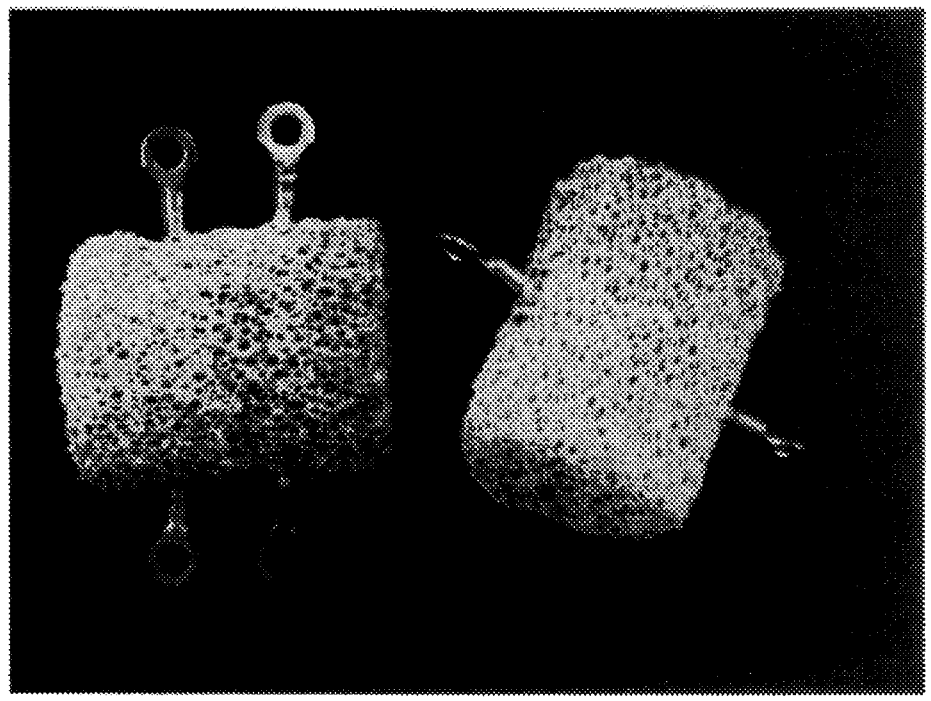
FIG. 8 shows two membrane filters, with one and two heating elements formed in-situ.
Figure 9:
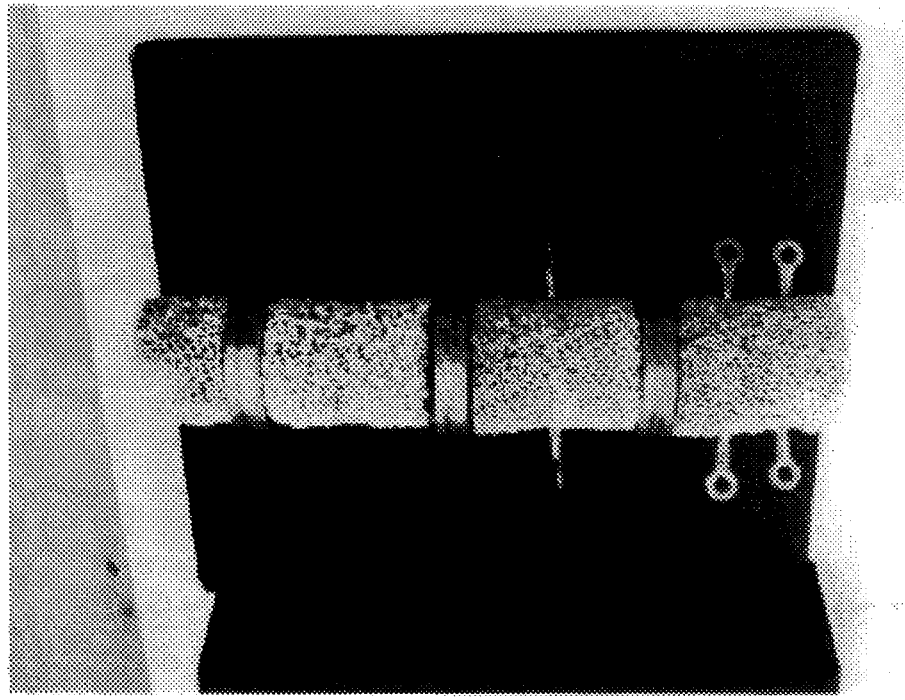
FIG. 9 shows a modulated membrane filter comprising four modules, two with no heating elements, one with one heating element and one with two.
Figure 10:
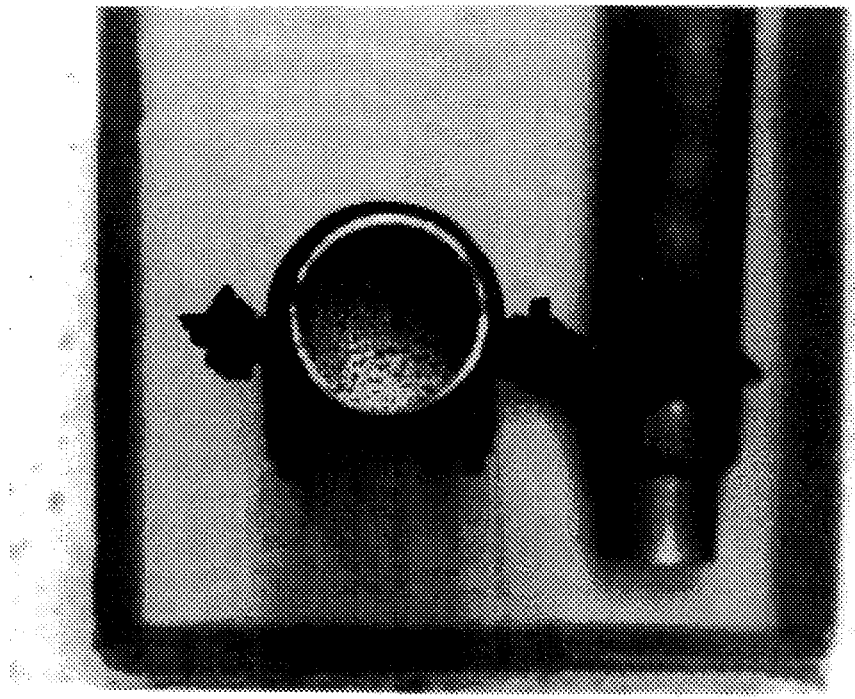
FIG. 10 shows a membrane filter as incorporated within a casing specifically adapted to be fitted in a land based vehicle.
Figure 11:
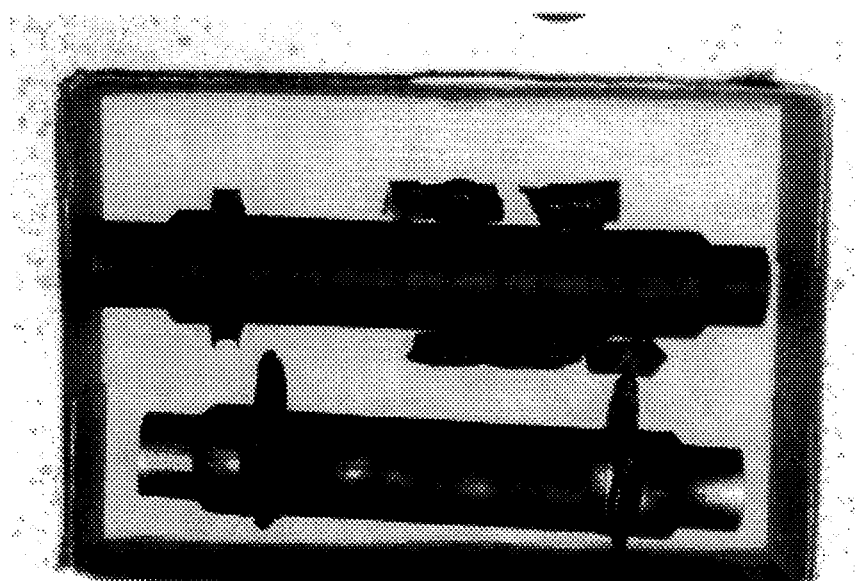
FIG. 11 shows perspective views of the casings having membrane filters incorporated therein, specifically adapted to be fitted in a land based vehicle (the membrane filters are not visible in this view)

See, FIG. 8 which shows two membrane filters, with one and two heating elements formed in-situ. The final material of the filter was a composite membrane of $Al_2O_3$/SiC when used as a particle trap for exhaust gases was found to effectively trap particulates. The heating element could be energized during use and after use as a particle trap to burn off the carbon deposit. Many such filters of size three inches in diameter and two inches in depth could be used in tandem to give a modulated membrane filter of greater length. See, FIG. 9, which shows a modulated membrane filter comprising four modules, two with no heating elements, one with one heating element and one with two. FIG. 10 shows a filter as incorporated within a casing specifically adapted to be fitted in a land based vehicle. FIG. 11 shows perspective views of the casings having membrane filters incorporated therein, specifically adapted to be fitted in a land based vehicle (the filters are not visible in this view).

EXAMPLE 2

A membrane filter with a porous size of five pores per inch, otherwise the same as example one.

EXAMPLE 3

Same as example one expect the membrane filter had various slurry coatings of nickel compounds (both combustible and non-combustible slurry coatings) applied thereto.

EXAMPLE 4

Same as example one expect the membrane filter had various coatings of platinum, ruthenium, rhodium, gold, silver, iron, titanium and palladium and compounds thereof, applied thereto.

EXAMPLE 5

The heating element was made of silicon carbide, otherwise the same as example 2.

EXAMPLE 6

The membrane filter was made according to Example 2, but heating element was of a conventional metallic material such as Fe—Cr—Al alloy or NiCr alloy. However, the heating elements made from molybdenum disilicides were found preferable.

EXAMPLE 7

A cylindrical shaped membrane filter (Micropyretics Heaters International's DPF), having 2.8 inches diameter, 3 inches length (several $Al_2O_3$/SiC membranes as in Example 1 were stacked together to yield a modulated membrane of 3 inches length) and 10 pores per inch, was used for Example 7. This filter had a U shaped HR-1550 element sandwiched in the length of the filter.

Initially, emission tests were conducted on an as is 1981 Volkswagon® Rabbit®, with a 1.6 L diesel engine. A BEAR® smokemeter was used to measure the opacity (in $m^{-1}$) of the exhaust gases of the Volkswagon® Rabbit® and a BEAR® tachometer was used to measure the revolutions per minute of the engine (RPM) of the same. The smokemeter was connected using a hose to the vehicle exhaust pipe and the tachometer was connected to the fuel pipe to the engine. This apparatus was interfaced with an IBM® Intel® 486 based computer to collect real time data. The car was started and warmed for ½ hour before the tests were conducted. The ambient temperature during the test was around −10° C.

A standard certification test procedure was used to measure the emission. The procedure involves a three step process. First, the opacity of the exhaust is measured under idle conditions, i.e. when the engine is just turned on, for a fixed amount of time. Then, the engine is immediately accelerated to the maximum RPM and maintained for a given time, after which the engine is deaccelerated to the idle state. These steps are repeated up to ten times to get the best four results, which are used to obtain the average opacity of the exhaust. The computer decides when it has received at least four uniform tests. If the first four are not uniform, then the computer asks for further tests until either four satisfactory results are obtained or a minimum of ten measurements are taken, whichever occurs first. The results given below in Table I are the values obtained at the highest RPM of the car (approximately 5300), without any filter attached to the car.

TABLE I

| Results obtained using the smokemeter with no filter. | | |
|---|---|---|
| Time | Average Opacity $m^{-1}$ | |
| 19:35 | 1.82 | No Filter used |
| 20:02 | 2.84 | No Filter used |
| 20:12 | 1.91 | No Filter used |
| 20:28 | 3.45 | No Filter used |

Average 2.5 $m^{-1}$

Next, the membrane filter was installed to the exhaust pipe of the car. The opacity test was then repeated. The results are presented in Table II. It was noted that the current drawn by the heating element was of the order of 25 amps, which is well below the 100 amps easily generated by a 12 V battery.

As noted above for all tests, at least four high RPM excursions are required by the computer. It was noted that when a filter was employed the computer was always satisfied with doing four tests. However when no filter was present the computer had to ask for ten tests.

TABLE II

Results obtained using the smokemeter with filter

| Time | Average Opacity m$^{-1}$ | |
|---|---|---|
| 19:52 | 1.5 | MHI DPF used |
| 19:54 | 1.99 | MHI DPF used |
| 20:16 | 1.26 | MHI DPF used |
| 20:33 | 1.1 | MHI DPF used |

Average 1.46 m$^{-1}$

As is obvious, when the DPF membrane filter is used there is a dramatic improvement in the exhaust gas emissions over the case when no filter is used. Also, the engine ran much more consistently and uniformly when a DPF membrane filter was used. When calculated as the weight of particles reduced per unit volume the results show an average reduction of 0.2 g/m$^3$ when the filter is used.

Advantageously, the modulated membrane filter aspect of the present invention may be used in a land-based vehicle, water-based vehicle, in power generation equipment or in an industrial engine. Similarly, the regenerative membrane filter aspect of the present invention may also be used advantageously in a land-based vehicle, water-based vehicle, in power generation equipment or in an industrial engine. More generally, the modulated membrane filter aspect of the present invention may be used in a regenerative exhaust system. Similarly, the regenerative membrane filter aspect of the present invention may also be used in a regenerative exhaust system. Analogously, the modulated membrane filter aspect can be used in a catalytic converter.

The modulated membrane filter of claim 1 or the regenerative membrane filter of claim 12, may be used in a diesel engine in combination with a preheater for heating the exhaust gases prior to the gases entering the filter.

From the above disclosure of the general principles of the present invention and the preceding detailed description, those skilled in the art will readily comprehend the various modifications to which the present invention is susceptible. Therefore, the scope of the invention should be limited only by the following claims and equivalents thereof.

We claim:

1. A regenerative membrane filter comprising:
   a means for filtering including at least one porous ceramic or ceramic composite membrane having been manufactured using micropyretic synthesis; and
   a means for regenerating said means for filtering, said means for regenerating being integral with said filtering means and further being formed in situ with said filtering means.

2. The regenerative filter of claim 1, wherein said regenerating means is formed in situ with said filtering means.

3. The regenerative filter of claim 1, wherein said ceramic or ceramic composite membrane is reticulated.

4. The regenerative filter of claim 1, wherein the means for regenerating comprises a catalyst.

5. The regenerative filter of claim 4, wherein the catalyst is applied to the filter by a method selected from the group consisting of coating, impregnating, and combinations thereof.

6. The regenerative filter of claim 4, wherein the catalyst can react or be reactive under conditions of vacuum, room temperature, increased temperature, pressure or combinations thereof.

7. The regenerative filter of claim 1, wherein said means for regenerating comprises a heating element.

8. The regenerative filter of claim 7, wherein said heating element comprises a compound selected from the group consisting of metallic material, molysilicides, Fe—Cr—Al, Ni—Cr, SiC and compounds and combinations thereof.

9. The regenerative filter of claim 7, wherein said heating element comprises a material selected from the group consisting of borides or aluminides of titanium, zirconium, niobium, tantalum, molybdenum, hafnium, chromium, and vanadium; carbides and oxides of titanium, hafnium, boron, aluminum, tantalum, silicon, tungsten, zirconium, niobium, and chromium; carbonitrides of titanium, niobium, and tantalum; nitrides of titanium, zirconium, boron, aluminum, silicon, tantalum, hafnium, and niobium; silicides of molybdenum, titanium, zirconium, niobium, tantalum, tungsten and vanadium; hydrides of titanium, zirconium and niobium; aluminum oxide-titanium boride; titanium carbide-titanium boride; aluminum oxide-titanium boride-titanium nitride; aluminum oxide-titanium boride-titanium carbide; boron carbide-aluminum oxide; molybdenum silicide-aluminum oxide; molybdenum boride-aluminum oxide; chromium carbide-aluminum oxide, vanadium nitride-aluminum oxide, aluminides of nickel, platinum, ruthenium, rhodium, gold, silver, iron, titanium and palladium and compounds thereof in the form of coatings, phosphides of nickel, titanium-nickel, oxides and oxychlorides of ruthenium, mullite, cordierite, lanthanum chromite, graphite and compounds and mixtures thereof.

10. The regenerative filter of claim 9, wherein each of said porous ceramic or ceramic composite membranes further comprises metallic particles, intermetallic particles or compounds or combinations thereof.

11. The regenerative filter of claim 10, wherein said particles, intermetallic particles or combinations thereof are selected from the group consisting of Cu, Ni, Pt, Al, Cr, Zr, Zn, Mg, Fe, Mn, Rh, Ru, NiAl, NiAl$_3$, CrSi, CrB Ti$_5$Si$_3$, NbB, Nb$_3$Al, NbAl$_3$, Nb$_2$Al and compounds and mixtures thereof.

12. The regenerative filter of claims 1, 7, 8 or 9, wherein said heating element is a high resistivity heating element, with a resistivity of between around 50–5000 μohm-cm.

13. In a land-based vehicle, water-based vehicle, in power generation equipment or in an industrial engine, said vehicles, equipment or engine, including a body and an exhaust system, the improvement comprising: a regenerative membrane filter in the exhaust system including a means for filtering which comprises at least one porous ceramic or ceramic composite membrane having been manufactured using micropyretic synthesis and a means for regenerating said means for filtering, said means for regenerating being integral with said filtering means and further being formed in situ with said filtering means.

14. The improvement of claim 13, wherein said ceramic or ceramic composite membrane is reticulated.

15. The improvement of claim 13, wherein said means for regenerating comprises a heating element.

16. The improvement of claim 13, wherein said means for filtering comprises reticulated ceramic or ceramic composite membranes having been manufactured using micropyretic synthesis; and said means for regenerating comprises a heating element.

17. The improvement of claim 16, wherein said heating element comprises a compound selected from the group consisting of metallic material, molysilicides, Fe—Cr—Al, Ni—Cr, SiC and combinations thereof.

18. The improvement of claim 15, wherein said heating element comprises a material selected from the group consisting of borides or aluminides of titanium, zirconium, niobium, tantalum, molybdenum, hafnium, chromium, and vanadium; carbides and oxides of titanium, hafnium, boron, aluminum, tantalum, silicon, tungsten, zirconium, niobium, and chromium; carbonitrides of titanium, niobium, and tantalum; nitrides of titanium, zirconium, boron, aluminum, silicon, tantalum, hafnium, and niobium; silicides of molybdenum, titanium, zirconium, niobium, tantalum, tungsten and vanadium; hydrides of titanium, zirconium and niobium; aluminum oxide-titanium boride; titanium carbide-titanium boride; aluminum oxide-titanium boride-titanium nitride; aluminum oxide-titanium boride-titanium carbide; boron carbide-aluminum oxide; molybdenum silicide-aluminum oxide; molybdenum boride-aluminum oxide; chromium carbide-aluminum oxide, vanadium nitride-aluminum oxide, aluminides of nickel, platinum, ruthenium, rhodium, gold, silver, iron, titanium and palladium and compounds thereof in the form of coatings phosphides of nickel, titanium-nickel, oxides and oxychlorides of ruthenium, mullite, cordierite, lanthanum chromite, graphite and compounds and mixtures thereof.

19. The improvement of claim 18, further comprising metallic particles, intermetallic particles and compounds and combinations thereof.

20. The improvement of claim 19, wherein said particles, intermetallic particles or combinations thereof are selected from the group consisting of Cu, Ni, Pt, Al, Cr, Zr, Zn, Mg, Fe, Mn, Rh, Ru, NiAl, $NiAl_3$, CrSi, CrB $Ti_5Si_3$, NbB, $Nb_3Al$, $NbAl_3$, $Nb_2Al$ and compounds and mixtures thereof.

21. The improvement of claims 15, 16, or 17, wherein said heating element is a high resistivity heating element, with a resistivity of between around 50–5000 μohm-cm.

22. In a regenerative exhaust system, the improvement comprising:

a regenerative membrane filter comprising a means for filtering which comprises a porous ceramic or ceramic composite membrane having been manufactured using micropyretic synthesis, and a means for regenerating said means for filtering, said means for regenerating being integral with said filtering means and further being formed in situ with said filtering means.

23. The improvement of claim 22, wherein said ceramic or ceramic composite membrane is reticulated.

24. The improvement of claim 22, wherein said means for regenerating comprises a heating element.

25. The improvement of claim 23, wherein said heating element comprises a compound selected from the group consisting of metallic material, molysilicides, Fe—Cr—Al, Ni—Cr, SiC and combinations thereof.

26. The improvement of claim 24, wherein said heating element comprises a material selected from the group consisting of borides or aluminides of titanium, zirconium, niobium, tantalum, molybdenum, hafnium, chromium, and vanadium; carbides and oxides of titanium, hafnium, boron, aluminum, tantalum, silicon, tungsten, zirconium, niobium, and chromium; carbonitrides of titanium, niobium, and tantalum; nitrides of titanium, zirconium, boron, aluminum, silicon, tantalum, hafnium, and niobium; silicides of molybdenum, titanium, zirconium, niobium, tantalum, tungsten and vanadium; hydrides of titanium, zirconium and niobium; aluminum oxide-titanium boride; titanium carbide-titanium boride; aluminum oxide-titanium boride-titanium nitride; aluminum oxide-titanium boride-titanium carbide; boron carbide-aluminum oxide; molybdenum silicide-aluminum oxide; molybdenum boride-aluminum oxide; chromium carbide-aluminum oxide, vanadium nitride-aluminum oxide, aluminides of nickel, platinum, ruthenium, rhodium, gold, silver, iron, titanium and palladium and compounds thereof in the form of coatings, phosphides of nickel, titanium-nickel, oxides and oxychlorides of ruthenium, mullite, cordierite, lanthanum chromite, graphite and compounds and mixtures thereof.

27. The improvement of claim 26, wherein said porous ceramic or ceramic composite membrane further comprises metallic particles, intermetallic particles and compounds and combinations thereof.

28. The improvement of claim 27, wherein said particles, intermetallic particles or combinations thereof are selected from the group consisting of Cu, Ni, Pt, Al, Cr, Zr, Zn, Mg, Fe, Mn, Rh, Ru, NiAl, $NiAl_3$, CrSi, CrB $Ti_5Si_3$, NbB, $Nb_3Al$, $NbAl_3$, $Nb_2Al$ and compounds and mixtures thereof.

29. The improvement of claims 23, 26, 27, or 28, wherein said heating element is a high resistivity heating element, with a resistivity of between around 50–5000 μohm-cm.

30. In a land-based vehicle, water-based vehicle, in power generation equipment or in an industrial engine, said vehicles, equipment or engine, including a body and an exhaust system, the improvement comprising:

a regenerative membrane filter in the exhaust system comprising a means for filtering which includes at least one porous ceramic or ceramic composite membrane manufactured using micropyretic synthesis; and a heating element having high resistivity, or having high emissivity or having both high resistivity and emissivity, for regenerating said means for filtering, said heating element being integral with said filtering means and further being formed in situ with said filtering means.

31. A modulated regenerative membrane filter for gaseous, liquid and particulate matter, wherein the modules in said filter are porous ceramic or ceramic composite membranes, said membranes having been manufactured using micropyretic synthesis, the filter comprising:

at least two porous ceramic or ceramic composite membranes; and a means for regenerating said filter, said means for regenerating being integral with said membranes and further being formed in situ with said filtering means.

* * * * *